(12) United States Patent
Minami et al.

(10) Patent No.: US 8,459,290 B2
(45) Date of Patent: Jun. 11, 2013

(54) MATERIAL GAS CONCENTRATION CONTROL SYSTEM

(75) Inventors: Masakazu Minami, Cupertino, CA (US); Daisuke Hayashi, Otsu (JP); Yuhei Sakaguchi, Osaka (JP); Katsumi Nishimura, Kyoto (JP); Masaki Inoue, Cupertino, CA (US); Kotaro Takijiri, Santa Clara, CA (US)

(73) Assignees: Horiba, Ltd., Kyoto-shi (JP); Horiba Stec, Co., Ltd., Kyoto-shi (JP)

( * ) Notice: Subject to any disclaimer, the term of this patent is extended or adjusted under 35 U.S.C. 154(b) by 806 days.

(21) Appl. No.: 12/610,019

(22) Filed: Oct. 30, 2009

(65) Prior Publication Data

US 2010/0108154 A1     May 6, 2010

(30) Foreign Application Priority Data

Oct. 31, 2008 (JP) .................................. 2008-282622
Oct. 31, 2008 (JP) .................................. 2008-282624
Oct. 31, 2008 (JP) .................................. 2008-282625

(51) Int. Cl.
    *B05C 11/00*     (2006.01)
(52) U.S. Cl.
    USPC ....... 137/93; 137/14; 137/87.05; 156/345.29; 118/689; 261/65
(58) Field of Classification Search
    USPC ..... 137/14, 88, 93, 87.05, 87.06; 156/345.29; 118/688–692, 715; 261/65, 119.1
    See application file for complete search history.

(56) References Cited

U.S. PATENT DOCUMENTS

| | | | | |
|---|---|---|---|---|
| 4,517,220 | A | * | 5/1985 | Rose .............................. 118/715 |
| 7,183,552 | B2 | * | 2/2007 | Russell ....................... 250/338.5 |
| 8,047,510 | B2 | * | 11/2011 | Hirata et al. .................... 261/65 |
| 2007/0254093 | A1 | | 11/2007 | Nijhawan et al. |

FOREIGN PATENT DOCUMENTS

| | | |
|---|---|---|
| JP | 61279678 | 12/1986 |
| JP | 04072717 | 3/1992 |
| JP | 08153685 | 6/1996 |
| JP | 09063965 | 3/1997 |
| JP | 2003-257871 | 9/2003 |
| JP | 2004338996 | 12/2004 |
| WO | WO 2008001483 A1 * | 1/2008 |

* cited by examiner

*Primary Examiner* — Eric Keasel
(74) *Attorney, Agent, or Firm* — Alleman Hall McCoy Russell & Tuttle LLP

(57) ABSTRACT

A material gas concentration control system for keeping a concentration of a material gas in a mixed gas constant comprising a tank to accommodate the material, an inlet line to input a carrier gas for evaporating the accommodated material into the tank, and an outlet line to output the mixed gas consisting of the material gas evaporated in the tank and the carrier gas, and further comprising a first valve arranged in the inlet line, a concentration measuring part that measures the concentration of the material gas in the mixed gas, and a concentration control part that controls an open degree of the first valve so as to make the measured concentration of the material gas measured by the concentration measuring part become the previously determined set concentration.

12 Claims, 13 Drawing Sheets

FIG. 7
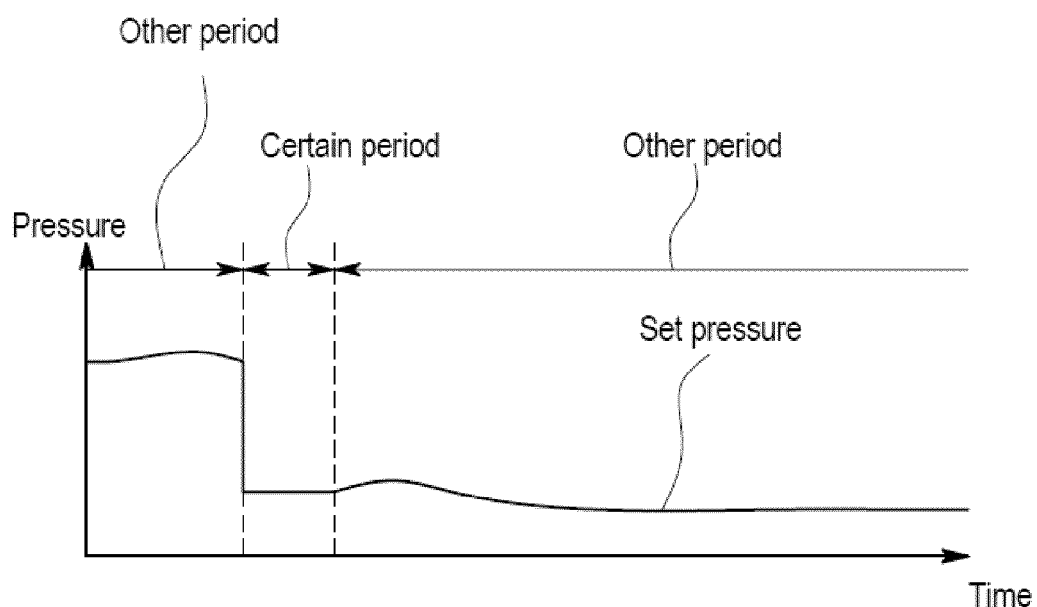
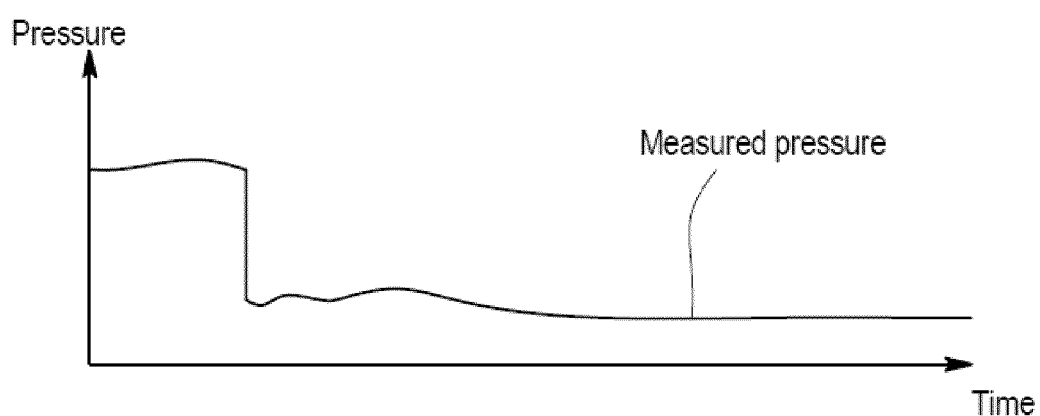
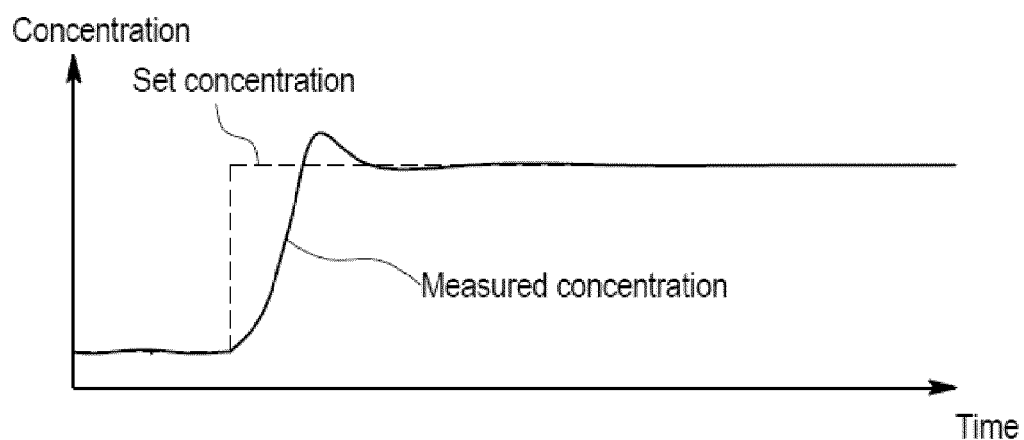

MATERIAL GAS CONCENTRATION CONTROL SYSTEM

FIELD OF THE ART

This invention relates to a system for controlling a concentration of a material gas that introduces a carrier gas to a solid or liquid material accommodated in a tank and that controls a concentration of the evaporated material gas in a material evaporation system for evaporating the material.

BACKGROUND ART

A representative material gas concentration control system for this kind of material evaporation system is shown in the patent documents 1 and 2 identified below, which comprises a mass flow controller arranged in an inlet line that introduces a carrier gas, a constant temperature bath to keep the tank where the material liquid is stored at a constant temperature, and a pressure sensor that is arranged in an outlet line to output the mixed gas comprising the material gas and the carrier gas and that measures a pressure, namely a total pressure, of the mixed gas.

This material gas concentration control system evaporates the material liquid constantly at a saturated vapor pressure with a temperature of the material liquid kept constant so as to make a partial pressure of the material gas constant, and controls the flow of the carrier gas so as to make the total pressure measured by the pressure sensor constant by the use of the mass flow controller. With this arrangement, since the concentration of a vapor component is expressed by the partial pressure of the vapor component divided by the total pressure of the system, the concentration of the vapor, i.e., the concentration of the material gas, is also considered to be constant because the partial pressure and the total pressure are constant.

PRIOR ART DOCUMENTS

Patent document 1: US Published Patent Application No. 2007/0254093
Patent document 2: Japanese Laid-Open Patent Publication No. 2003-257871

DISCLOSURE OF THE INVENTION

Problems to be Solved by the Invention

However, where the above-mentioned concentration control system is used, it is difficult to control the concentration of the material gas at a desired concentration with higher accuracy and to control the concentration with high speed and good responsiveness due to the following various factors.

<<Influence on Concentration Control by the Temperature Change in the Tank>>

First, even though the tank is kept at a constant temperature by the use of a constant temperature bath, since the saturated vapor pressure changes due to the drop of the temperature because of the heat of vaporization at a time of vaporizing the material liquid, and the pressure of the material gas also changes, the concentration of the material gas deviates from the desired concentration. In addition, when the amount of the material liquid changes, a contact period during which the carrier gas contacts the material liquid or a state of the carrier gas contacting the material liquid by means of bubbling changes, so that the material gas fails to achieve vapor-liquid equilibrium and saturate the vapor gas. As a result, the partial pressure of the material gas changes so that the concentration deviates from the desired concentration. Furthermore, even though the temperature is practically kept constant by the use of the constant temperature bath, it is very difficult to keep the partial pressure of the material gas constant.

In addition, even though the material liquid is vaporized at the saturated vapor pressure on a constant basis, when trying to change the concentration of the material gas, it is necessary to change the saturated vapor pressure by changing the temperature in the tank. Since it usually takes a long time to change the temperature in the tank, the responsiveness of controlling the concentration of the material gas becomes bad.

<<Influence on Concentration Control by Increase of Gas Volume in Tank>>

Second, as shown by a graph in FIG. 8, when the gas volume increases due to decrease of the material liquid in the tank, if the set concentration is changed, control time (setting time) to settle the measured concentration at the newly set concentration becomes long. This is because the flow of the carrier gas necessary for making the concentration of the material gas at a desired concentration by changing the total pressure in the tank increases. As a result, the gas substituting time for the gas in the tank to be substituted at the desired gas concentration becomes lengthy.

In other words, if the material liquid decreases, a system that was formerly well controlled is changed to a system that wastes a large amount of time. Then at a time when a step to change the set concentration is input, the output measured concentration overshoots significantly and hunting occurs. As a result, the setting time becomes lengthy.

In addition, the response speed is lowered because the concentration measuring part undergoes various changes in the measuring environment, and the wasted time is increased. This also becomes a contributing factor to the problem that the setting time becomes lengthy.

In order to solve these problems, it can be conceived that the flow of the carrier gas is increased so as to shorten the gas substitute time, resulting in shortening the setting time. However, if the flow of the carrier gas is changed, the flow of the material gas or the total flow also changes. As a result, it is not possible to keep the flow constant.

<<Increase of Waste Time Due to the Increase of the Gas Volume in the Tank>>

Third, with this arrangement, when the gas volume increases due to decrease of the material liquid in the tank, if the set concentration is changed, it takes time for all of the mixed gas in the tank to be exchanged with the mixed gas having the newly set concentration. Namely, if the liquid material decreases, there is a problem that the control time to be at the desired concentration becomes lengthy when the set concentration is newly changed because the residence time of the tank may be large.

In order to solve this problem, conventionally a liquid volume meter is arranged in the tank so as to detect when the amount of the material liquid becomes less than the previously determined liquid amount and to re-supply the tank with the liquid material appropriately. With this arrangement, the problem that the control time becomes lengthy can be prevented. However, this arrangement becomes a cause of generating a troublesome procedure of mounting the liquid volume meter in the tank and generating an additional cost.

The present claimed invention intends to solve the above-discussed problems, and a first object of this invention is to provide a highly responsive material gas concentration control system that controls the concentration of the material gas without controlling the flow of the carrier gas, and that can keep the concentration of the material gas in the mixed gas constant even though the evaporation rate of the material fluctuates.

In addition, a second object of the present claimed invention is to provide a material gas concentration control system that can stabilize the measured concentration at the set concentration in a short period of time, even though the set concentration is changed, in the case that the material liquid in the tank decreases or the responsive speed of the concentration measuring part is low.

Furthermore, a third object of the present claimed invention is to provide a material gas concentration control system that can prevent the problem that it takes time to stabilize the set concentration at a newly set concentration by estimating that the material liquid in the tank has decreased without using a detector such as a liquid volume meter.

Means to Solve the Problems

More specifically, the material gas concentration control system to attain the first object of this invention is used for a material evaporation system comprising a tank to accommodate a material, an inlet line to input a carrier gas for evaporating the accommodated material into the tank and an outlet line to output a mixed gas consisting of a material gas formed of the evaporated material and the carrier gas from the tank, and is characterized by comprising a first valve arranged in the outlet line, a concentration measuring part that measures the concentration of the material gas in the mixed gas and a concentration control part that controls an open degree of the first valve so as to make the measured concentration of the material gas measured by the concentration measuring part become a previously determined set concentration, wherein the concentration measuring part comprises a pressure measuring part that measures a pressure in the tank, the concentration control part comprises a set pressure setting part that changes the set pressure so as to reduce a deviation between the measured concentration and the set concentration and a first valve control part that controls an open degree of the first valve so as to make a measured pressure measured by the pressure measuring part become the set pressure, and controls the measured concentration of the measured material gas so as to be the previously determined set concentration.

In this specification, the concept of the pressure in the tank includes the pressure in the tank itself and includes the pressure of the mixed gas in the outlet line located upstream of the first valve.

With this arrangement, since the concentration of the material gas itself in the mixed gas is measured by the concentration control part and the open degree of the first valve is controlled by the concentration control part so as to be the previously determined set concentration, even though the evaporation rate of the material gas fluctuates in the case that the material liquid fails to achieve vapor-liquid equilibrium in the tank or the state of bubbling changes, it is possible to keep the concentration constant irrespective of the fluctuation.

In other words, it is possible to keep the concentration of the mixed gas constant without keeping the evaporated amount of the material liquid constant by controlling the temperature in the tank.

In addition, since the concentration of the material gas in the mixed gas is controlled by controlling the opening of the first valve, it is possible to control the concentration of the material gas with higher responsiveness and with a smaller time lag because it is not necessary to wait for temperature change compared with a case of controlling the amount of the material gas by controlling the temperature in the tank.

Furthermore, since the concentration measuring part and the first valve are arranged in the outlet line at a position closer to the following process, fluctuation hardly occurs in the concentration once controlled. As a result, the mixed gas can be easily supplied to the following process while keeping the accuracy of the required concentration of the material gas.

In addition, with the material gas concentration control system having this arrangement, it is possible to keep the material gas concentration at the previously determined concentration even though the vapor state of the material changes due to the fluctuation of the flow of the carrier gas. As a result, it is possible to set the flow of the mixed gas arbitrarily.

Furthermore, since the concentration measuring part comprises the pressure measuring part to measure the pressure in the tank, and the concentration control part comprises the set pressure setting part to change the previously determined set pressure so as to reduce the deviation between the measured concentration and the set concentration, and the first valve control part to control the open degree of the first valve so as to make the measured pressure measured by the pressure measuring part at the set pressure, and the measured concentration of the material gas is controlled to be the previously determined set concentration, it is possible to control the total pressure of the mixed gas that can be easily controlled with high responsiveness by means of the first valve so that the concentration of the material gas in the mixed gas can be controlled with high accuracy. With this arrangement, since the concentration is controlled, not by controlling the flow by the use of the mass flow controller, but by controlling the pressure, the responsiveness is good.

Furthermore, since the concentration is controlled by controlling the first valve by the use of a value of the pressure such as the set pressure and the measured pressure, the concentration can be controlled without manufacturing a special control circuit for controlling the concentration. As a result, it is possible to reduce a cost in designing or developing the concentration control.

In order to make it possible to also control the flow of the material gas or the mixed gas that flows in the outlet line to be constant in a static state wherein the concentration of the material gas in the mixed gas is constant, the material gas concentration control system comprises a second valve arranged in the inlet line, a flow measuring part that measures a flow of the carrier gas flowing in the inlet line, and a flow control part that controls an open degree of the second valve so as to make the measured flow of the carrier gas become the set carrier gas flow calculated based on the previously determined set flow of the material gas or the mixed gas flowing in the outlet line and the set concentration, or the previously determined set carrier gas flow. With this arrangement, since the concentration is kept constant by the concentration control part, the flow of the material gas or the mixed gas also becomes constant if the flow of the carrier gas is kept constant. In addition, there is no need of conducting feedback of the information concerning each gas in a side of the outlet line to the flow control part in order to control the second valve, and it is possible to supply a flow of the material gas or the mixed gas stably in a state where at least the concentration is controlled to be constant.

In order to make it possible not only to control the concentration of the material gas in the mixed gas to be constant but also to control the mass flow of the material gas or the total flow to be constant at a time of a transient response, the material gas concentration control system comprises a second valve arranged in the inlet line, a flow measuring part that measures a flow of the carrier gas flowing in the inlet line, and a flow control part that calculates a flow of the material gas or the mixed gas flowing in the outlet line based on the measured concentration of the material gas and the measured flow of the carrier gas, and controls an open degree of the second valve so as to make the calculated flow become the previously determined set flow. With this arrangement, it is possible to conduct the control with two degrees of freedom wherein an object to be controlled is independently controlled such that the first valve is used for controlling mainly the concentration and the second valve is used for controlling mainly the mass flow of the material gas or the total flow.

As a concrete embodiment to control the flow of the carrier gas represented, the flow control part comprises a set carrier gas setting part that changes the previously determined set carrier gas flow so as to reduce a deviation between the calculated flow and the set flow, and a second valve control part that controls the open degree of the second valve so as to make the measured carrier gas flow measured by the flow measuring part become the set carrier gas flow.

In order to make it possible to measure the concentration of the material gas in the mixed gas with high accuracy so as to control the concentration accurately, the concentration measuring part comprises a partial pressure measuring sensor that measures a partial pressure of the material gas by the non-dispersive infrared (NDIR) method and a concentration calculating part that calculates the concentration of the material gas based on the measured partial pressure of the material gas and the measured pressure.

In addition, the material gas concentration control system of this invention is used for a material evaporation system comprising a tank to accommodate a material, an inlet line to input a carrier gas for evaporating the accommodated material into the tank and an outlet line to output a mixed gas consisting of a material gas constituting the evaporated material and the carrier gas from the tank, and is characterized by comprising a first valve arranged in the outlet line, a concentration measuring part to measure the concentration of the material gas in the mixed gas, a pressure measuring part to measure the pressure in the tank, a temperature measuring part to measure the temperature in the tank, and a concentration control part to control an open degree of the first valve so as to make the measured concentration of the material gas measured by the concentration measuring part become a previously determined set concentration, wherein the concentration control part comprises a total pressure calculating part to calculate the pressure in the tank so as to make the concentration of the material gas become the set concentration based on a measured temperature measured by the temperature measuring part, a set pressure setting part that sets the set pressure as the pressure in the tank calculated by the total pressure calculating part during a predetermined period after the set concentration is changed, while the set pressure setting part that changes the set pressure so as to reduce a deviation between the measured concentration and the set concentration during other period, and a first valve control part that controls an open degree of the first valve so as to make a measured pressure measured by the pressure measuring part become the set pressure.

In this specification, a concept of the pressure in the tank includes the pressure in the tank itself and the pressure of the mixed gas in the outlet line located upstream of the first valve.

In accordance with this arrangement, since the total pressure calculating part calculates the pressure in the tank to make the material gas at the set concentration based on the measured temperature measured by the temperature measuring part and the set pressure setting part makes the set pressure as the pressure in the tank calculated by the total pressure calculating part during the predetermined period after the set concentration is changed, the open degree of the first valve can be controlled irrespective of the measured concentration measured by the concentration measuring part. With this arrangement, it is possible to prevent hunting that might result from the unstable concentration because the first valve is controlled in accordance with the fluctuation of the measured concentration and the controlled result of the first valve appears later than the total pressure in the tank. In addition, since the set pressure is set based on the temperature in the tank, it is possible to set the set pressure at a value close to the pressure in case that the measured concentration is kept at the set concentration, and to make the measured concentration at the value close to the set concentration after the predetermined period.

In addition, since the set pressure setting part sets the set pressure so as to reduce the deviation between the measured concentration and the set concentration during other period, it is possible to control the subtle deviation between the measured concentration and the set concentration that remains after the predetermined period so as to be corrected.

As a result, since it is possible to prevent the hunting of the measured concentration resulting from delay of the control of the total pressure in the tank because the material liquid level is reduced and to control the concentration even though the deviation between the measured concentration and the set concentration is small, the time required for stabilizing the measured concentration at the set concentration can be shortened.

After the predetermined period, in order to shorten the time required to stabilize the measured concentration by controlling the concentration with the deviation between the measured concentration and the set concentration set as small as possible, the total pressure calculating part calculates a saturated vapor pressure of the material gas based on the measured temperature measured by the temperature measuring part and calculates the pressure in the tank based on the saturated vapor pressure so as to make the concentration of the material gas become the set concentration.

Furthermore, the material gas concentration control system in accordance with this invention is used for a material evaporation system comprising a tank to accommodate a material, an inlet line to input a carrier gas for evaporating the accommodated material into the tank and an outlet line to output a mixed gas consisting of a material gas comprising the evaporated material and the carrier gas from the tank, and is characterized by comprising a first valve arranged in the outlet line, a concentration measuring part that measures the concentration of the material gas in the mixed gas, a pressure measuring part that measures a pressure in the tank, a concentration control part that controls an open degree of the first valve so as to make the measured concentration of the material gas measured by the concentration measuring part become a previously determined set concentration, and a material amount estimating part that estimates an amount of the material accommodated in the tank, wherein the concentration control part comprises a set pressure setting part that changes the set pressure so as to reduce a deviation between the measured concentration and the set concentration, and a first valve control part that controls an open degree of the first valve so as to make a measured pressure measured by the pressure measuring part become the set pressure, and the material amount estimating part estimates and calculates an amount of the material accommodated in the tank based on the set pressure.

In accordance with this arrangement, the set pressure setting part changes the previously determined set pressure in accordance with the measured concentration and the first valve control part controls the first valve so as to make the measured pressure measured by the pressure measuring part become the set pressure. Then it is possible to control the concentration so that the measured concentration becomes the previously determined set concentration. In case that the material is, for example, liquid, if the contacting time while the gas bubbles of the carrier gas contact the material liquid decreases due to the lowered liquid level because of decrease of the material liquid, the material liquid fails to achieve vapor-liquid equilibrium with the carrier gas and the partial pressure of the material liquid drops. In the case of controlling the concentration of the gas as mentioned above, since it is necessary to lower the total pressure in order to control the concentration so as to be adjusted to the dropped partial pressure of the material gas, the set pressure setting part changes the set pressure to a lower value. In other words, since there is a correlation between the amount of the material stored in the tank and the set pressure, it is possible for the material amount estimating part to estimate and to calculate the amount of the material stored in the tank based on the set pressure changed by the set pressure setting part. In addition, in case that the material is a solid, since the value of the set pressure is decreased because the surface area where the material contacts the carrier gas is decreased according to evaporation of the material, it is possible to estimate the amount of the material. In this specification, a concept of the pressure in the tank includes the pressure in the tank itself and includes the pressure of the mixed gas in the outlet line locating upstream of the first valve.

As mentioned, it is possible for the material amount estimating part to estimate the amount of the material stored in the tank without including an additional sensor such as a liquid volume meter in the tank. Accordingly, since the material can be supplied appropriately by gauging the amount of the material stored in the tank without an additional cost, it is possible to prevent a problem that it takes time to stabilize the concentration at the set concentration due to the decrease of the material.

In addition to a case where the contacting time for the bubbles of the carrier gas with the material liquid is shortened because the liquid level drops, or a case where evaporation causes changes in the surface area, there are other causes for the partial pressure of the material gas to drop. For example, the change of the saturated vapor pressure due to a temperature change in the tank changes the ease of the evaporation for the material liquid, which affects changing the set pressure. In order to make it possible to compensate for the error fluctuations due to temperature changes in the tank when estimating the amount of the stored material that remains, the material gas concentration control system further comprises a temperature measuring part that measures a temperature in the tank, wherein the material amount estimating part calculates a calculated pressure representing a pressure to be measured by the pressure measuring part in a state that the concentration is kept at the set concentration based on the measured temperature measured by the temperature measuring part, and estimates and calculates the amount of the material accommodated in the tank based on the set pressure and the calculated pressure.

Effect of the Invention

In accordance with this invention, since the concentration of the material gas in the mixed gas is measured by the concentration measuring part and the measured concentration is controlled by the first valve so as to be at the desired value, even though the concentration of the material gas in the tank fluctuates, it is possible to control the output concentration irrespective of the fluctuation. In addition, in case of changing the concentration, since the concentration is controlled not by changing the amount of the material gas by means of temperature change over time but by the use of the first valve, the concentration can be controlled with high responsiveness.

In addition, in accordance with the material gas concentration control system of this invention, since the first valve is controlled by the set pressure that the total pressure calculating part calculates based on the temperature in the tank during the predetermined period after the set pressure is changed, it is possible to prevent a case in which it takes time to stabilize the concentration at a predetermined value because of the control delay due to the decrease of the material liquid in the tank and hunting in a control response when changing the set concentration. As a result, a throughput of the process can be improved.

Furthermore, in accordance with the material gas concentration control system of this invention, it is possible to estimate the amount of the material stored in the tank without including an additional sensor such as a liquid volume meter in the tank. Accordingly, since the material can be supplied appropriately based on the estimated amount of the material, it is possible to prevent a problem that it takes time to stabilize the concentration at the set concentration due to the decrease of the material.

BRIEF DESCRIPTION OF THE DRAWINGS

FIG. 7 is a graph showing one example of a result of controlling a concentration in accordance with a second embodiment.

BEST MODES OF EMBODYING THE INVENTION

Embodiment

A first embodiment of this invention will now be explained with reference to drawings.

First Embodiment

A material gas concentration control system 100 in accordance with this invention is used for, for example, providing a stable isopropyl alcohol (IPA) concentration in a dry processing tank of a wafer cleaning unit used for a semiconductor manufacturing process. More specifically, this system 100 is used for a bubbling system 1 that provides an evaporated IPA material liquid L into the dry processing tank. The IPA material liquid L corresponds to the material in the claims and the bubbling system 1 corresponds to the material evaporation system in the claims. If the material is a solid, this invention produces the same effects. In addition, this invention is not limited to controlling the concentration of the evaporated IPA material liquid L. This invention can also be used for controlling the concentration in, for example, a chemical vapor deposition (CVD) film deposition system or a metal-organic chemical vapor deposition (MOCVD) film deposition system.

Figure 1:
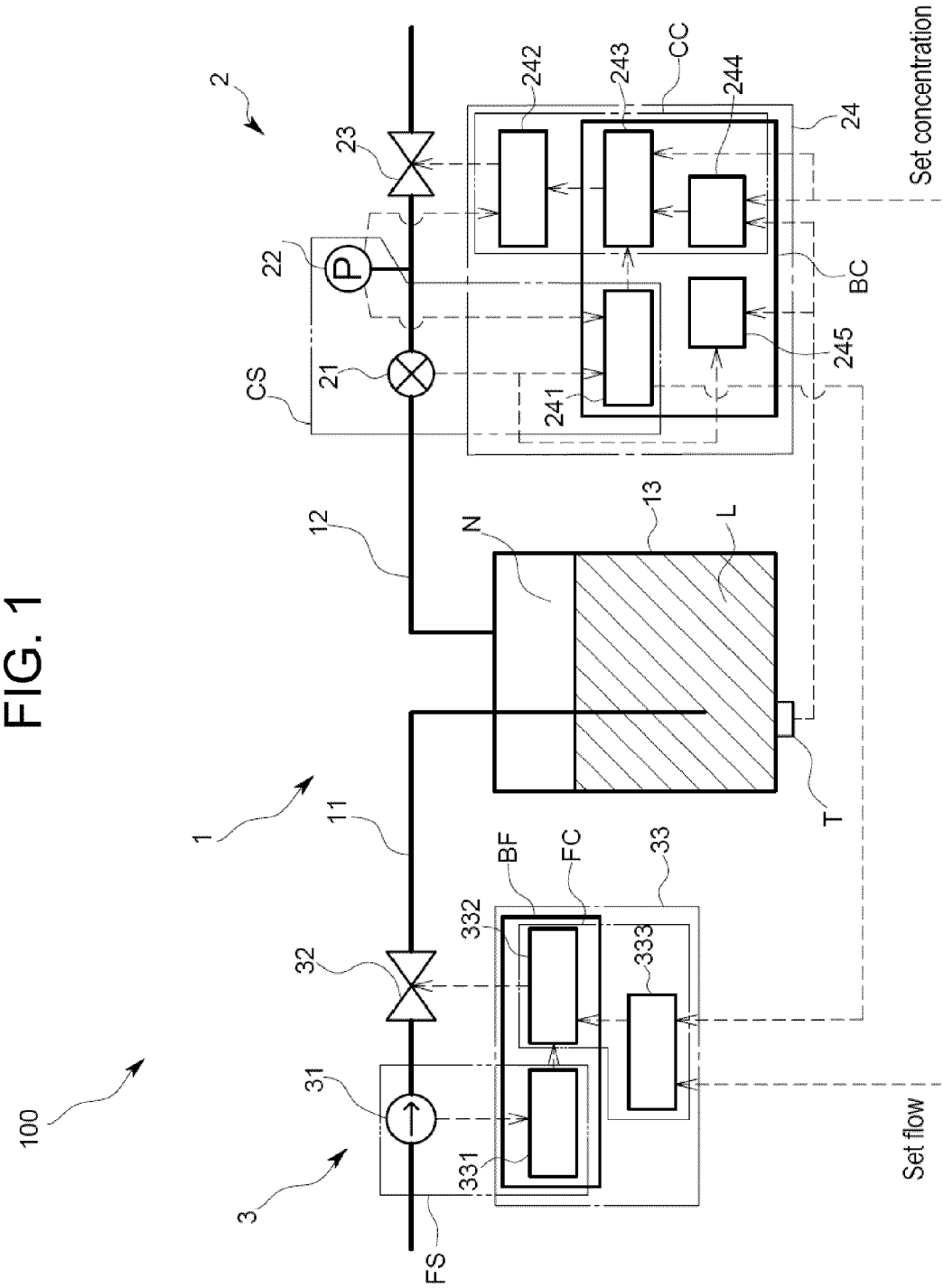
FIG. 1 is a schematic diagram of a material gas concentration control system in accordance with a first embodiment of this invention.

As shown in FIG. 1, the bubbling system 1 comprises a tank 13 to store the material liquid L, an inlet line 11 to input a carrier gas into the liquid material L stored in the tank 13 so as to cause bubbling and an outlet line 12 to output a mixed gas consisting of a material gas constituting the evaporated material liquid L and the carrier gas from a space N above the material liquid L stored in the tank 13. A temperature sensor T is mounted on the tank 13 to measure the temperature of the inside of the tank 13.

The material gas concentration control system 100 comprises a mass flow controller 3 (a flow controller) arranged in the inlet line 11 to control a flow of the carrier gas and a concentration controller 2 arranged in the outlet line 12 to control a concentration of the material gas in the mixed gas. The concentration controller 2 in this embodiment controls the concentration of the material gas by controlling a total pressure of the mixed gas.

Figure 2:
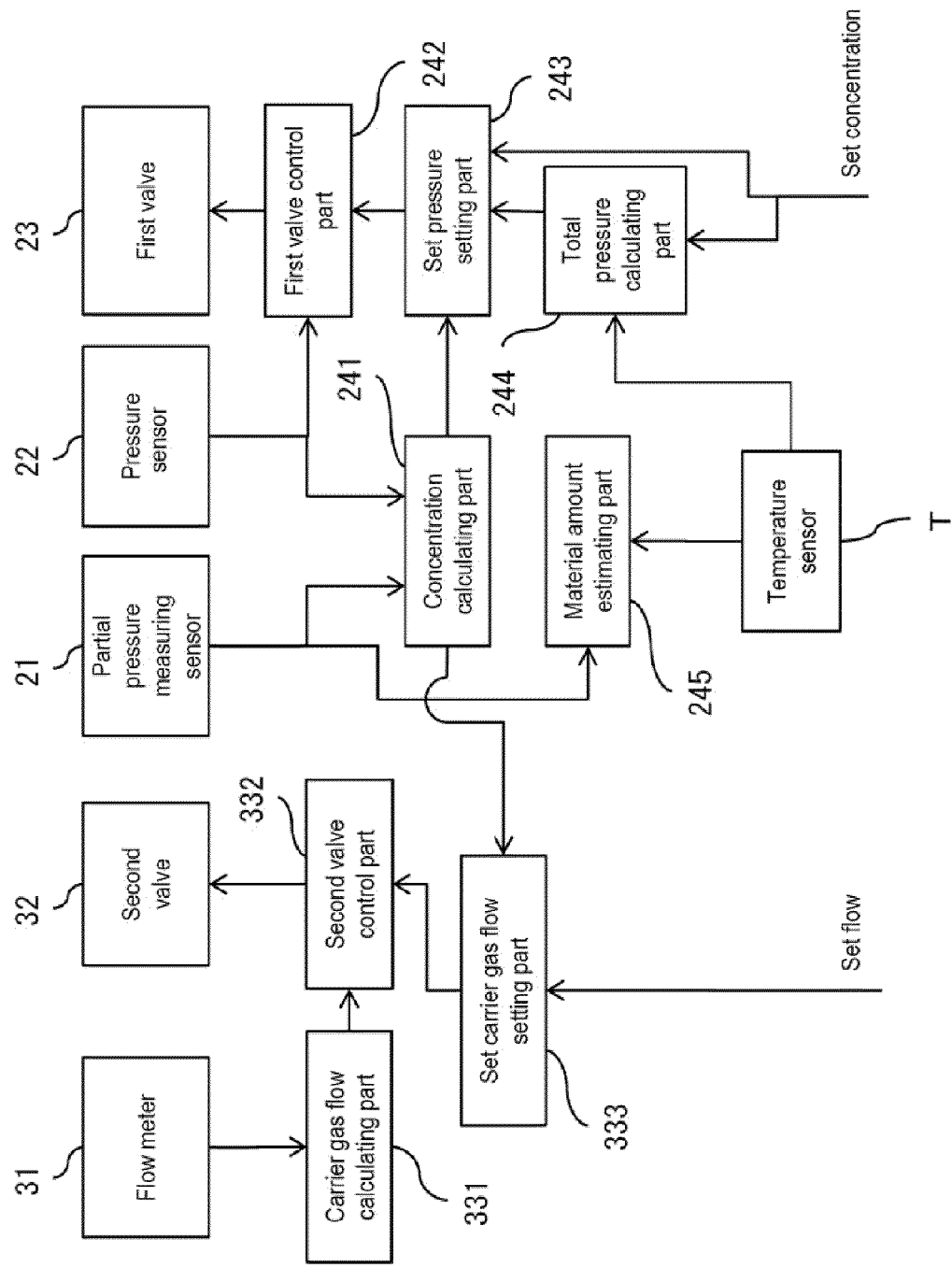
FIG. 2 is a function block diagram in accordance with the first embodiment.

First, each unit will be described with reference to FIG. 1 and FIG. 2.

The concentration controller 2 comprises a concentration measuring part CS to measure the concentration of the material gas in the mixed gas, a pressure sensor 22 constituting a pressure measuring part to measure a pressure (a total pressure) of the mixed gas representing a pressure in the tank 13, and a first valve 23 to control the total pressure of the mixed gas by means of an open degree of the valve body (valve position), each of which is arranged in this order along a flow path, and further comprises a concentration controller control part 24. In order to control the concentration of the material gas in the mixed gas, it is necessary to arrange the pressure sensor 22 upstream of the first valve 23. This is to enable detection of changes to vaporization conditions of material liquid L by measuring the total pressure in the tank 13 accurately and calculating the concentration of the material gas in the mixed gas accurately.

The concentration measuring part CS comprises a partial pressure measuring sensor 21 to measure a partial pressure of the material gas by a non-dispersive infrared (NDIR) method and a concentration calculating part 241 to calculate the concentration of the material gas in the mixed gas based on the partial pressure of the material gas measured by the partial pressure measuring sensor 21 and the total pressure representing a measured pressure measured by the pressure sensor 22. The concentration of the material gas in the mixed gas is calculated by dividing the partial pressure by the total pressure obtained from an the equation of state of the gas.

The concentration controller control part 24 comprises the above-mentioned concentration calculating part 241, a concentration control part CC and a material liquid amount estimating part 245 to estimate an amount of the material liquid L in the tank 13. The concentration control part CC controls the first valve 23 so that the measured concentration measured by the concentration measuring part CS results in the previously determined set concentration, and comprises the first valve control part 242, a set pressure setting part 243 to set a set pressure for the first valve control part 242 and a total pressure calculating part 244 to calculate a temporary set pressure set for the first valve control part 242 by the set pressure setting part 243 during a predetermined period after the set concentration is changed.

The first valve control part 242 controls an open degree of the first valve 23 so as to make the pressure (the total pressure) measured by the pressure sensor 22 become a set pressure, which is a pressure set by the set pressure setting part 243.

The set pressure setting part 243 sets the set pressure, as a temporary set pressure, representing the pressure in the tank 13 calculated by a total pressure calculating part 244, to be described later, during a predetermined period after the set concentration is changed, and changes the previously determined set pressure so as to reduce a deviation between the measured concentration measured by the concentration measuring part CS and the set concentration during other period.

More concretely, a state is kept to set the temporary set pressure calculated by the total pressure calculating part 244 as the set pressure, without changing the set pressure for the first valve control part 242 during a predetermined period after the set concentration is changed, even though the partial pressure of the material gas to be measured or the total pressure of the mixed gas fluctuates. The predetermined period is a time required for the measured concentration to reach a desired concentration or a time required for fully reducing the deviation, and it may be obtained on an experimental basis or may be set arbitrarily.

During another period after the predetermined period, namely, during an ordinary operating period, the set pressure setting part 243 changes the set pressure so as to reduce the deviation between the measured concentration and the set concentration for the first valve control part 242 according to the fluctuation of the partial pressure of the measured material gas or the total pressure of the mixed gas. Concretely, in the case that the measured concentration is higher than the set concentration, the concentration can be lowered by increasing the total pressure because the concentration is obtained by dividing the partial pressure by the total pressure. Accordingly, in case that the measured concentration is higher than the set concentration, the set pressure setting part 243 changes the set pressure so as to increase the total pressure to the first valve control part 242. As a result, the first valve control part 242 controls the first valve 23 to have a small degree of opening. Where the measured concentration is lower than the set concentration, a reverse procedure is conducted.

As mentioned, to change the set pressure to reduce the deviation between the measured concentration and the set concentration means that the set pressure is changed to be higher than a case where the measured concentration is higher than the set concentration, while the set pressure is changed to be lower than a case where the measured concentration is lower than the set concentration.

The total pressure calculating part 244 calculates a pressure in the tank in order to make the concentration of the material gas become the set concentration at a measured temperature, as measured by the temperature sensor T and sets the pressure as the temporary pressure. The calculated temporary set pressure is transmitted to the set pressure setting part 243 and the temporary set pressure is used as the set pressure setting for the first valve control part 242 by the set pressure setting part 243 at a start-up time or during a predetermined period after the set concentration is changed.

Calculation of the pressure in the tank 13 by the total pressure calculating part 244 will be explained concretely. The total pressure calculating part 244 calculates a saturated vapor pressure of the material gas based on a temperature in the tank 13. Then the total pressure calculating part 244 calculates the pressure, namely the total pressure in the tank 13 to make the concentration of the material gas become the newly set concentration, assuming that the material liquid L is at vapor-liquid equilibrium conditions. Since the concentration is expressed by dividing the partial pressure by the total pressure, the pressure in the tank 13 can be obtained by dividing the saturated vapor pressure of the material gas at the measured temperature by the newly set concentration.

The material liquid amount estimating part 245 calculates the saturated vapor pressure of the material gas in the tank 13 at the temperature measured by the temperature sensor T, and estimates the amount of the material liquid L in the tank 13 by comparing the saturated vapor pressure with the measured partial pressure of the material gas as measured by the partial pressure measuring sensor 21. More concretely, if the amount of the material liquid L is reduced, the material liquid L fails to achieve vapor-liquid equilibrium because of a reduction in a contacting time between bubbles of the carrier gas and material liquid L. As a result, the partial pressure of the material gas becomes smaller than the saturated vapor pressure. Where, for example, a ratio of the partial pressure of the measured material gas to the saturated vapor pressure is smaller than a predetermined value, the material liquid amount estimating part 245 estimates that a stored amount of the material liquid L is less than a specified stored amount of the material liquid L. Then if the material liquid amount estimating part 245 estimates that the stored amount of the material liquid L falls below the specified stored amount, this state is displayed so as to urge the material liquid L be supplied.

The concentration controller control part 24 makes use of a computer and comprises an internal bus, a CPU, a memory, an I/O channel, an A/D converter and a D/A converter or the like. Functions for the first valve control part 242, the concentration calculating part 241, the set pressure setting part 243, the total pressure calculating part 244 and the material liquid amount estimating part 245 can be produced by operating the CPU and its peripheral devices according to predetermined programs previously stored in the memory. Only the first valve control part 242 is composed of a control circuit such as an independent one-chip microcomputer so as to receive the set pressure. The pressure can be easily controlled by inputting the set pressure by means of the pressure sensor 22 and the first valve 23 as one unit. With this arrangement, since it is possible to use a control circuit or software that has been conventionally developed for pressure control in order to control the concentration, increases in design or development costs for the control part can be prevented.

As mentioned, the concentration controller 2 controls the concentration of the mixed gas by itself.

The mass flow controller 3 comprises a thermal flow meter 31 constituting a flow measuring part to measure a volume flow of the carrier gas flowing into the inlet line 11 and the second valve 32 to adjust a flow of the carrier gas by means of adjusting the open degree of the valve body, each of which is arranged in this order along a flow path, and further comprises a mass flow controller control part 33. The flow measuring part may use a differential pressure type flow meter.

The mass flow controller control part 33 comprises a carrier gas flow calculating part 331 that calculates the flow of the carrier gas based on a signal from the thermal flow meter 31 and a flow control part FC that calculates the flow of the material gas or the mixed gas flowing in the outlet line 12 based on the measured concentration of the material gas and the measured flow of the carrier gas and controls the open degree of the second valve 32 so as to make the calculated flow become the previously set flow.

The flow control part FC comprises a second valve control part 332 and a set carrier gas flow setting part 333 that sets the set flow to the second valve control part 332.

The second valve control part 332 controls the open degree of the second valve 32 so as to make the measured carrier gas flow become the set carrier gas flow as set by the set carrier gas flow setting part 333.

The set carrier gas flow setting part 333 changes the previously determined set carrier gas flow so as to reduce the deviation between the calculated flow and the set flow. To reduce the deviation between the calculated flow and the set flow will be concretely explained. In the case that the calculated flow of the material gas or the mixed gas is larger than the set flow of the material gas or the mixed gas, the set carrier gas flow setting part 333 changes the set carrier gas flow to the second valve control part 332 so as to reduce the flow of the carrier gas, assuming that the concentration is kept constant by means of the concentration control part CC. In the case that the calculated flow is smaller than the set flow, a reverse procedure is conducted. Since the concentration is expressed by dividing the partial pressure by the total pressure, a mass flow of the material gas divided by a total mass flow is equal to a sum of the mass flow of the material gas and the mass flow of the carrier gas. Accordingly, if the concentration is kept constant, an increase or decrease of the mass flow of the carrier gas itself can increase or decrease a volumetric flow of the material gas and the total flow. In the case that the calculated flow is smaller than the set flow, a reverse procedure is conducted.

The carrier gas flow calculating part 331 and the second valve control part 332 function by means of a control circuit BF comprising a CPU, a memory, an I/O channel, an A/D converter and a D/A converter or the like. The control circuit BF is specialized for controlling the flow, and receives a signal of the flow set value representing a value of the flow to be controlled by the mass flow controller 3 or a signal from the thermal flow meter 31. The set carrier gas flow setting part 333 functions by a general purpose one-chip microcomputer.

As mentioned, the mass flow controller 3 only controls the flow of the carrier gas in the inlet line 11, resulting in controlling the flow of the material gas or the mixed gas.

Figure 3:
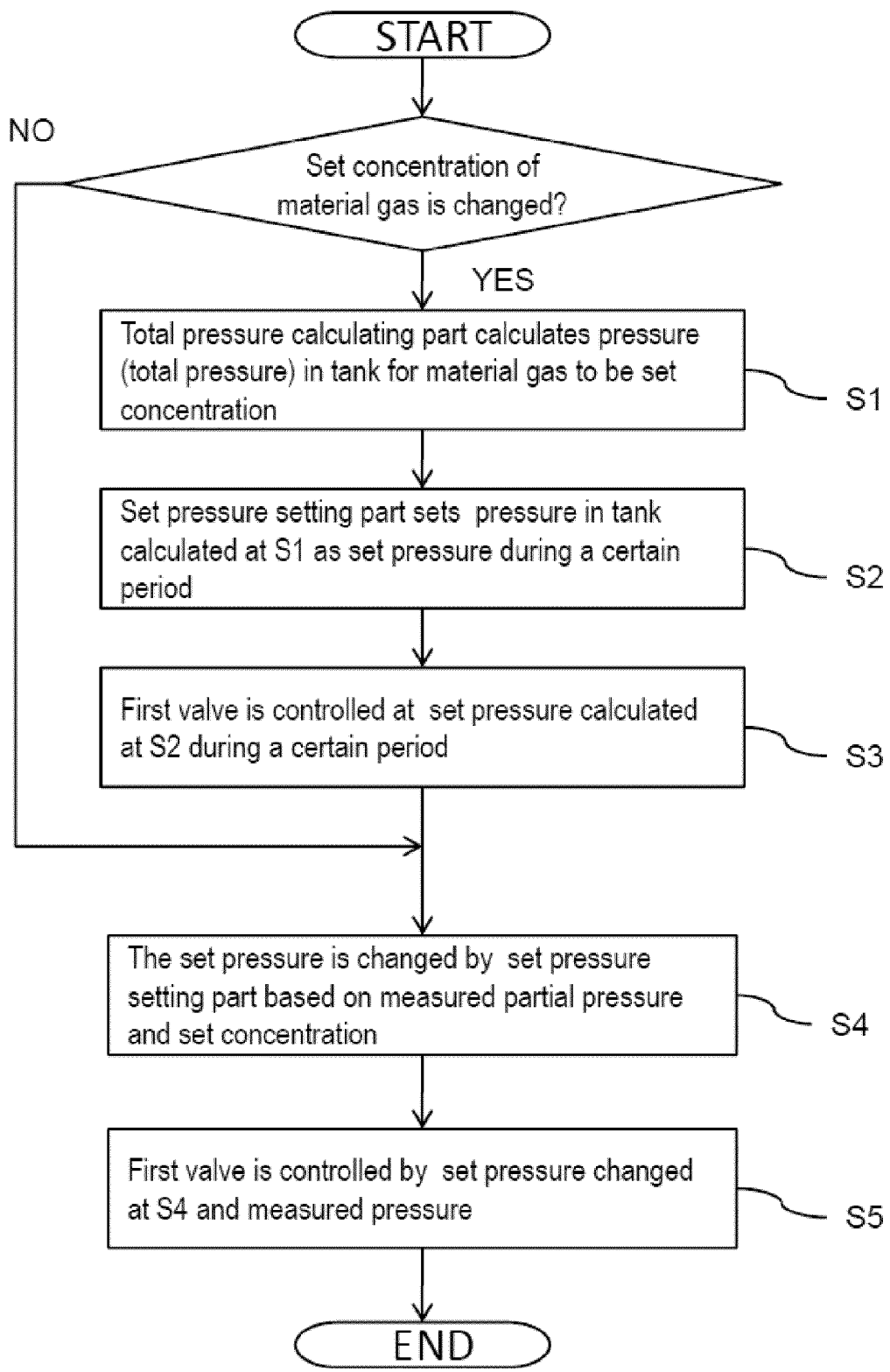
FIG. 3 is a flow chart showing a method of operating the material gas concentration control system in accordance with the first embodiment.
Figure 4:
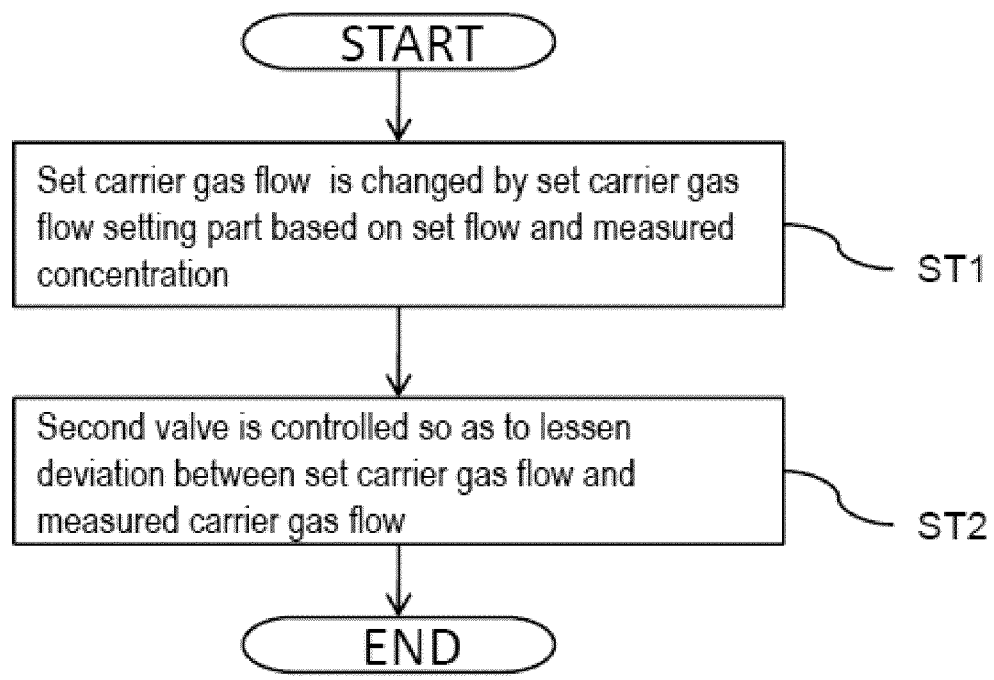
FIG. 4 is a flow chart showing a method of controlling a carrier gas flow in accordance with the first embodiment.

Next, an operation of controlling the concentration of the material gas in the mixed gas and an operation of controlling the flow of the mixed gas and the material gas will be explained with reference to the flow charts in FIG. 3 and FIG. 4.

First, an operation of controlling the concentration by controlling the open degree of the first valve 23 so as to be the set concentration will be explained with reference to FIG. 3.

The concentration calculating part 241 calculates the concentration of the material gas in the mixed gas by the expression (1) using the partial pressure of the material gas measured by the partial pressure measuring sensor 21 and the total pressure of the mixed gas measured by the pressure sensor 22.

$$C=P_z/P_t \tag{1}$$

Wherein, C is the concentration, $P_z$ is the partial pressure of the material gas, and $P_t$ is the total pressure of the mixed gas.

At a start-up time, when the set concentration is first set or when the set concentration is changed, the total pressure calculating part 244 first calculates the saturated vapor pressure of the material gas based on the temperature measured by the temperature sensor T. In the case that the partial pressure of the material gas is the calculated saturated vapor pressure, the pressure in the tank 13, namely, the total pressure $P_{ts}$ (the temporary set pressure) of the mixed gas, is calculated by the expression (1) using the set concentration and the calculated partial pressure (step S1).

The set pressure setting part 243 sets the total pressure $P_{ts}$ (the temporary set pressure) as the set pressure with the first valve control part 242 and then does not change the set pressure during a predetermined period after the set concentration is changed even though the partial pressure of the material gas fluctuates (step S2). The first valve control part 242 controls the open degree of the first valve 23 by means of the set pressure $P_{ts}$ during the predetermined period, controlling the concentration, measured by the concentration measuring part CS, to be the set concentration or a value close to the set concentration (step S3).

At a time of an ordinary operation after expiration of the predetermined period, in the case where the concentration measured by the concentration measuring part CS is different from the set concentration set by the set pressure setting part 243, the set pressure setting part 243 changes the set pressure $P_{t0}$ as follows based on the partial pressure $P_z$ measured by the partial pressure measuring sensor 21 and the set concentration $C_0$ by the expression (2) (step S4).

$$P_{t0}=P_z/C_0 \tag{2}$$

Wherein, $P_z$ is a value continuously measured by the partial pressure measuring sensor 21, and where $C_0$ is a known value because it is a set concentration.

At a time when the set pressure is changed to $P_{t0}$, the first valve control part 242 controls the open degree of the first valve 23 so as to reduce the deviation between the total pressure $P_t$ measured by the pressure sensor 22 and the set pressure $P_{t0}$ (step S5).

The most recently measured concentration of the material gas in the mixed gas becomes the set concentration $C_0$ if the partial pressure $P_z$ of the material gas does not fluctuate while the measured pressure $P_t$ follows the set pressure $P_{t0}$.

In case that the partial pressure $P_z$ of the material gas fluctuates while the measured pressure $P_t$ follows the set pressure $P_{t0}$, the set pressure setting part 243 changes the set pressure $P_{t0}$ again by the expression (2) so as to be the set concentration $C_0$.

Next, the control of the material gas or the total flow in the outlet line 12 will be explained with reference to FIG. 4. The flow of the material gas is controlled by the mass flow controller 3 irrespective of control of the concentration by the concentration controller 2.

Assuming that the set flow $Q_{z0}$ of the material gas is set by the set carrier gas flow setting part 333. First, a relationship between the flow and the concentration is expressed by the following expression (3).

$$C=P_z/P_t=Q_z/Q_t=Q_z/(Q_c+Q_z) \tag{3}$$

Wherein, $Q_z$ is the material gas flow, $Q_t$ is the total mass flow, and $Q_c$ is the carrier gas flow.

The set carrier gas flow setting part 333 sets the set carrier gas flow $Q_{c0}$ by the following expression (4) that is a modification of the expression (3) (step ST1).

$$Q_{c0}=Q_{z0}(1-C)/C \tag{4}$$

Wherein, the concentration C is a value continuously measured by the concentration measuring part CS, and where $Q_{z0}$ is a known value because it is a set value.

At a time when the set carrier gas flow is changed to $Q_{c0}$, the second valve control part 332 controls the open degree of the second valve 32 so as to reduce the deviation between the carrier gas flow $Q_c$ measured by the flow measuring part and the set carrier gas flow $Q_{c0}$ (step ST2).

The finally measured flow of the carrier gas becomes the set carrier gas flow $Q_{c0}$ if the concentration C does not fluctuate while the measured carrier gas flow $Q_c$ follows the set carrier gas flow $Q_{c0}$.

In the case that the concentration C fluctuates while the measured carrier gas flow $Q_c$ follows the set carrier gas flow $Q_{c0}$, the set carrier gas flow setting part 333 changes the set carrier gas flow $Q_{c0}$ again by the expression (4) so as to be the predetermined material gas flow $Q_{z0}$.

As mentioned, in accordance with the material gas concentration control system 100 of this invention, since the concentration is controlled with the total pressure which may be easily controlled by the first valve 23 set as the control variable, it is possible to control the concentration of the material gas with high accuracy and high responsiveness even though the material gas fails to achieve vapor-liquid equilibrium or the evaporation rate of the material gas fluctuates.

In addition, since the concentration controller 2 that controls the concentration is arranged in the outlet line 12, a distance between a position where the concentration is controlled to a fixed value and a position where the mixed gas is output to the downstream process is short. Thus, it is possible to output the mixed gas to the downstream process without almost any fluctuation of the concentration.

Furthermore, it is possible to control the concentration of the material gas in the mixed gas as well as to control the flow of the material gas and the total flow to be constant by the use of the concentration controller 2 and the mass flow controller 3.

Other embodiments will now be explained.

In the above-mentioned embodiment, the concentration of the material gas in the mixed gas is controlled by controlling the first valve 23 so as to make the total pressure of the mixed gas become the set pressure. However, the first valve 23 may be controlled with the concentration measured by the concentration measuring part CS set as the control variable.

In the above-mentioned embodiment, both the concentration of the material gas and the flow of the material gas are controlled. However, in the case where only the concentration is to be controlled, the concentration controller 2 alone will suffice without the mass flow controller 3. More specifically, the material gas concentration control system may be a material gas concentration control system that is used for a material evaporation system comprising a tank to accommodate a material, an inlet line to input a carrier gas for evaporating the accommodated material into the tank and an outlet line to output a mixed gas consisting of a material gas formed by the evaporated material and the carrier gas from the tank, and characterized by comprising a first valve arranged in the outlet line, a concentration measuring part that measures the concentration of the material gas in the mixed gas and a concentration control part that controls an open degree of the first valve so as to make the measured concentration of the material gas measured by the concentration measuring part become a previously determined set concentration.

With this arrangement also, since the concentration of the material gas in the mixed gas itself is measured by the concentration measuring part and the open degree of the first valve is controlled so as to be the predetermined set concentration by the concentration control part, even though the generated amount of the material gas fluctuates, it is possible to keep the concentration constant in case that the material liquid fails to evaporate at the saturated vapor pressure in the tank or the sate of bubbling changes.

The concentration measuring part CS calculates the concentration by the use of the partial pressure and the total pressure. However, the concentration may also be directly measured. In addition, the partial pressure measuring sensor 21 is not limited to the non-dispersive infrared method, and may be of a Fourier transform infrared (FTIR) spectroscopic method or a laser absorption spectroscopic (LAS) method.

In order to control the flow of the material gas, the second valve 32 may be controlled so as to reduce the deviation between the set flow and a calculated flow of the material gas, which is calculated based on the measured concentration and the measured carrier gas flow.

Figure 5:
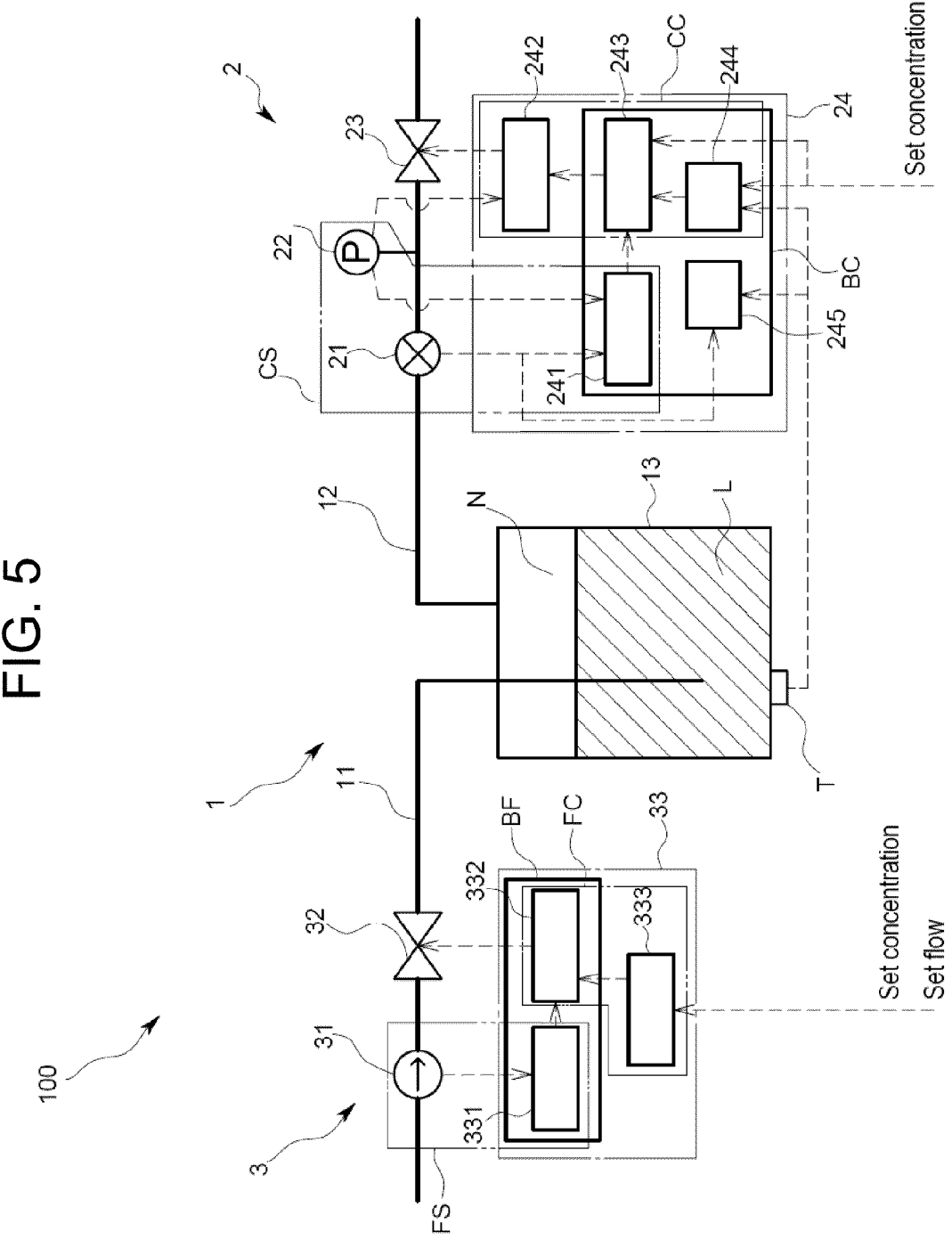
FIG. 5 is a schematic diagram of a material gas concentration control system in accordance with another configuration of the first embodiment of this invention.

In the case where only the concentration of the material gas in the mixed gas is desired to be controlled with a high accuracy and where the flow is not a fixed value but is stable, the flow may be controlled without feedback of the measured concentration from the concentration controller 2 to the mass flow controller 3 as shown in FIG. 5. In this case, the set carrier gas flow may be calculated based on the expression (3) using the set concentration and the set flow. In addition, if the set carrier gas flow is previously determined and if the carrier gas flows according to the determined flow, the flow of the material gas or the mixed gas becomes constant to the extent that the concentration is kept constant by the concentration controller 2. In the case where the set carrier gas flow is previously determined, the set carrier gas flow may be directly input to the second valve control part 332 with an arrangement wherein the set carrier gas flow setting part 333 is omitted.

A temperature sensor may be provided to the concentration controller 2 so as to compensate for temperature changes to the measured result of the pressure or the partial pressure. With this arrangement, it is possible to control the concentration with higher accuracy. In addition, a signal showing a deteriorated state of a light source may be obtained from the partial pressure measuring part. For example, the concentration controller control part may have such an arrangement that a lifetime of the light source is gauged by means of a moment-to-moment change of a current flowing through the light source so that a notice to urge exchanging the light source before a critical effect is exerted on the measurement result may be displayed.

Figure 6:
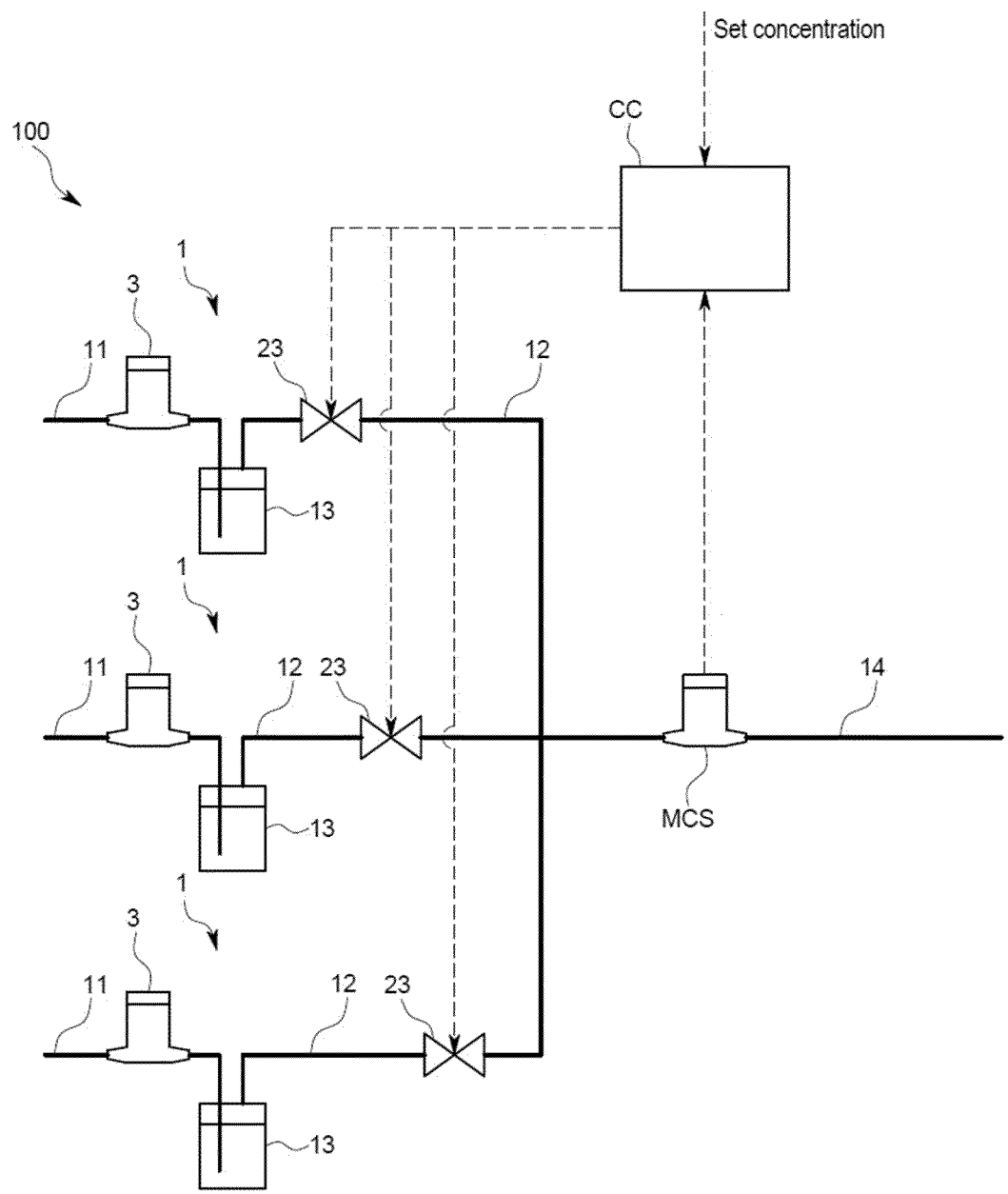
FIG. 6 is a schematic diagram of a material gas concentration control system in accordance with a different configuration of the first embodiment of this invention.
Figure 8:
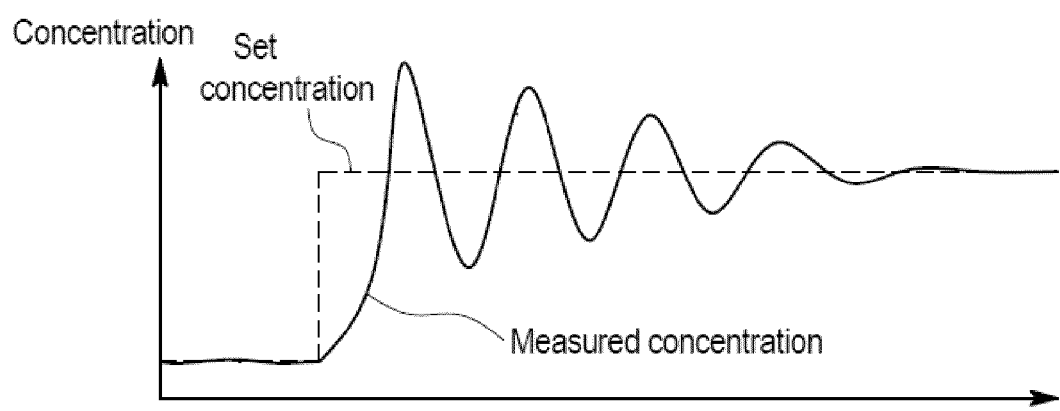
FIG. 8 is a graph showing a result of controlling a concentration at a time of changing a set concentration by a conventional material gas concentration control system.

As shown in FIG. 6, in order to make a mixed gas of multiple components, multiple bubbling systems 1, each of which produces a different kind of material gas, are arranged in parallel and each of the outlet lines 11 converges so as to form a converged outlet line 14. In this case, in order to configure a material gas concentration control system 100 by controlling the concentration of each material gas with high accuracy and with reducing a cost by decreasing a number of the concentration measuring part as much as possible, the material gas concentration control system 100 may comprise a first valve 23 arranged in each outlet line 11, a multiple component concentration measuring part MCS that can measure the concentration of the gas having multiple components arranged in the converged outlet line 14 and the concentration control part CC that controls the open degree of each first valve 23 so as to make the measured concentration of each material gas measured by the multiple component concentration measuring part MCS become the set concentration previously determined for each material gas.

With this arrangement, it is possible to control the open degree of the first valve 23 for every bubbling system just by providing a single multiple component concentration measuring part MCS for the converged outlet line 14. The concentration control part CC may store in memory a command of open degree to be output to each first valve 23 for every measured material gas, and thereby control each first valve 23 so as to reduce the deviation between the measured concentration of each material gas and the previously determined set concentration of each material gas.

More generally, a material gas concentration control system to control the concentration of the gas evaporated from a material may be a material gas concentration control system that is used for a material evaporation system comprising a tank to accommodate a material, an inlet line to input a carrier gas for evaporating the accommodated material into the tank and an outlet line to output a mixed gas consisting of a material gas constituting the evaporated material and the carrier gas from the tank, wherein multiple material evaporation systems are arranged in parallel, each of which produces a different kind of a material gas, and a converged outlet line is formed by converging each of the outlet lines, and the material gas concentration control system comprises a first valve arranged in each outlet line, a multi-component concentration measuring part to measure the concentration of each material gas in the mixed gas flowing in the converged outlet line, and a concentration control part to control each first valve so as to make the measured concentration of each material gas measured by the multi component concentration measuring part become the set concentration previously determined for each material gas.

Furthermore, if the concentration is controlled and the mass flow controller 3 is arranged in each inlet line 11, it is possible to also control the flow to be constant because the concentration is controlled to be constant.

In addition, in the above-mentioned embodiment, the concentration measuring part comprises the pressure sensor that measures the total pressure of the mixed gas and the partial pressure measuring sensor. However, the concentration measuring part may measure the concentration by itself such as from ultrasonic concentration meter. Furthermore, the pressure sensor is shared for measuring the concentration and for controlling the first valve. However, the pressure sensor for measuring the concentration and the pressure sensor for controlling the first valve may be independently provided or the concentration measuring part may not use the total pressure.

The present claimed invention may be variously modified without departing from the spirit of the invention.

Second Embodiment

One embodiment of this invention will be explained with reference to the drawings. A configuration of the second embodiment is the same as that of the first embodiment and shown in FIG. 1 and FIG. 2. In addition, an operation of controlling the concentration is also the same as that of the first embodiment and shown in FIG. 3 and FIG. 4.

In the second embodiment, an operation of controlling the concentration of the material gas and its effect in a state that the material liquid L is decreased will be described. In the state that the material liquid L is decreased, an example of the result in case that the concentration of the material gas is controlled is shown in FIG. 7. During a predetermined period after the set concentration is changed, the pressure in the tank, which is to be the set concentration under the saturated vapor pressure of the material gas calculated based on the temperature in the tank by the total pressure calculating part 244, is kept as the set pressure. The predetermined period may be, for example, about 10 seconds, or may be experimentally determined according to a capacity of the tank. The period while the set pressure is kept may be decided, for example, with providing a reference to an overshoot of the measured concentration, which is to be several percent of the set concentration. Since the set pressure is kept during the predetermined period, the measured pressure is also controlled to a value close to the set pressure.

As a result of this, the measured concentration does not largely overshoot from the set concentration. In addition, the remaining deviation between the set concentration and the measured concentration is also controlled toward zero by controlling the concentration, which may be controlled by changing the set pressure by using the measured concentration again after expiration of the predetermined period. From these results, a time required for stabilizing the measured concentration to be generally the same value as that of the set concentration is reduced.

As mentioned, with the material gas concentration control system 100 in accordance with this embodiment, since the pressure in the tank 13 calculated based on the temperature in the tank 13 by the total pressure calculating part 244 is kept as the set pressure during the predetermined period after the set pressure is changed by the set pressure setting part 243, and since the concentration is controlled by changing the set pressure based on the measured concentration during other period, it is possible to also stabilize the measured concentration at the set concentration in the case where the set concentration is changed when the material liquid L decreases.

As a result, since it is possible to supply the mixed gas of the desired concentration in a short period of time, a throughput of the process can be improved.

Other embodiment will be explained.

In the above-mentioned embodiment, the total pressure calculating part 244 calculates the pressure in the tank at the set concentration based on the saturated vapor pressure of the material gas, however, the total pressure calculating part 244 may calculate the pressure by the use of a value approximate to the saturated vapor pressure. With this arrangement, it is possible to consider a fixed degree of allowance for extreme changes in the vapor state of the material liquid L due to the change of the set pressure.

The material gas concentration control system may comprise the first valve arranged in the outlet line, the concentration measuring part that measures the concentration of the material gas in the mixed gas, the pressure measuring part that measured the pressure in the tank, the temperature measuring part that measures the temperature in the tank, and the concentration control part that controls the opening of the first valve so as to make the measured concentration of the material gas measured by the concentration measuring part become the previously determined set concentration, and may be characterized such that the concentration control part comprises the total pressure calculating part that calculates the pressure in the tank so as to make the concentration of the material gas become the set concentration based on the measured temperature measured by the temperature measuring part and the first valve control part that controls the opening of the first valve so as to reduce the deviation between the pressure in the tank and the measured pressure measured by the pressure measuring part during a predetermined period after the set concentration is changed, while controlling the opening of the first valve so as to reduce the deviation between the measured concentration measured by the concentration measuring part and the set concentration during the other period.

With this arrangement, the total pressure calculating part can calculate the pressure in the tank so as to make the concentration of the material gas become the set concentration based on the temperature in the tank measured during the predetermined period after the set concentration is changed, and the first valve control part can control the concentration so as to reduce the deviation between the calculated pressure in the tank and the pressure measured by the pressure measuring part with the pressure value regarded as the reference value during the predetermined period after the set concentration is changed irrespective of the measured concentration measured by the concentration measuring part. As a result, similar to the above-mentioned embodiment, it is possible to control the open degree of the valve according to the vapor state of the material in the tank so as to shorten the response time or to avoid overshoot during the predetermined period after the set concentration is changed. In addition, since the first valve control part controls the concentration again with the value of the concentration set as the reference so as to reduce the deviation between the set concentration and the measured concentration after the predetermined period, it is possible to shorten a setting time without hunting.

As a result, it is possible to prevent a problem that the hunting occurs at a time of changing the set concentration or the setting time becomes lengthy due to decrease of the material liquid.

In the above-mentioned embodiment, the concentration measuring part comprises the pressure sensor to measure the total pressure of the mixed gas and the partial pressure measuring part, however, the concentration measuring part may measure the concentration directly, for example, using an ultrasonic concentration sensor. In addition, the pressure sensor is shared for measuring the concentration and for controlling the first valve, however, the pressure sensor for measuring the concentration and the pressure sensor for controlling the first valve may be independently provided, or the concentration measuring part may not use the total pressure.

In addition, the modified embodiment shown in the first embodiment may be used and various modification may be applied without departing from a spirit of the invention.

Third embodiment

Another embodiment of this invention will now be explained with reference to drawings.

A third embodiment is a material gas concentration control system having generally the same configuration as that of the first and the second embodiments, but differing in the configuration of the concentration controller 2.

First, the third embodiment will be described with reference to FIG. 9 and FIG. 10.

Figure 9:
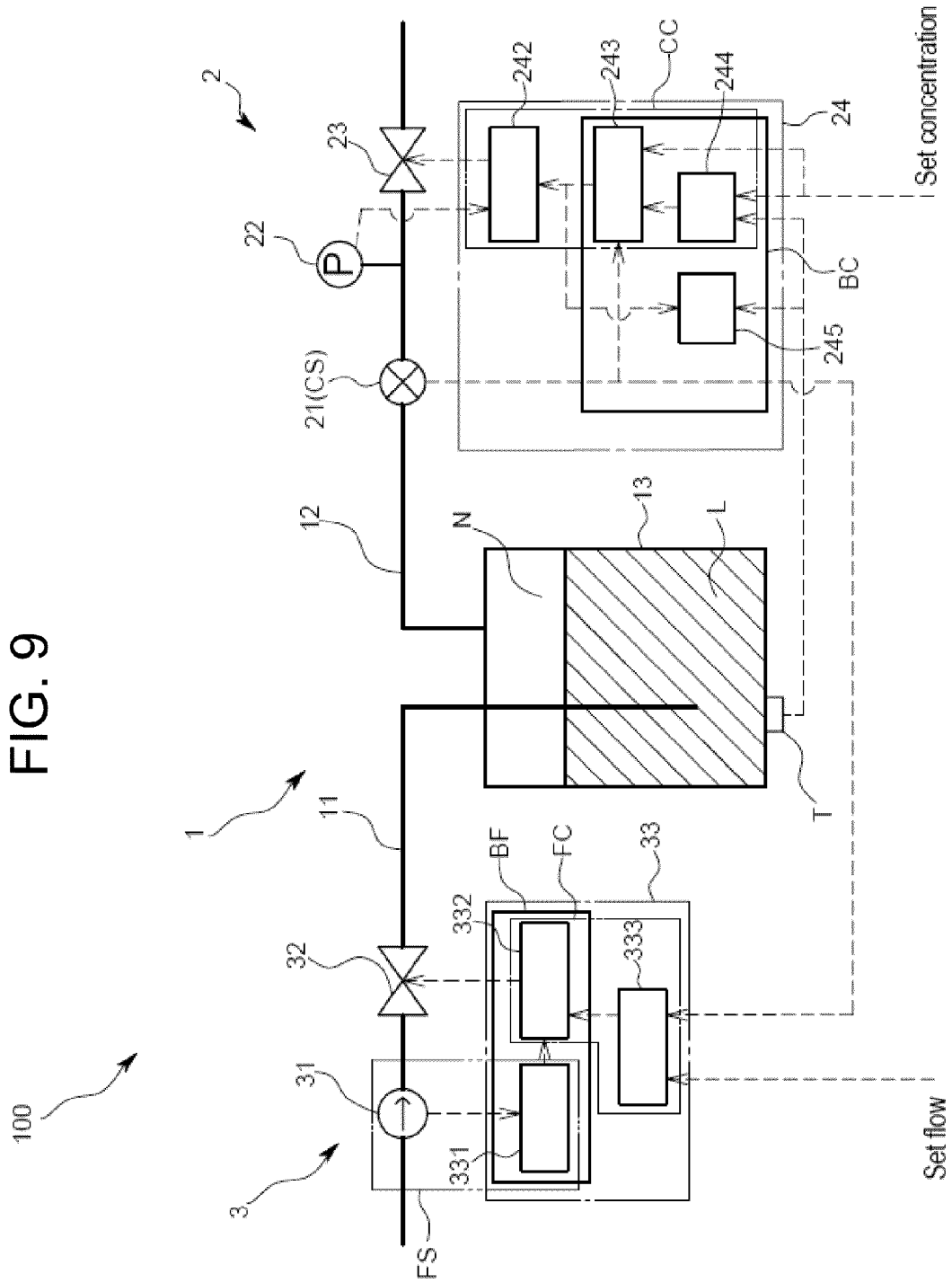
FIG. 9 is a schematic diagram of a material gas concentration control system in accordance with a third embodiment of this invention.

As shown in FIG. 9, the concentration controller 2 comprises a concentration measuring part 21(CS) to measure the concentration of the material gas in the mixed gas, a pressure sensor 22 constituting a pressure measuring part to measure a pressure (a total pressure) of the mixed gas representing a pressure in the tank 13, and a first valve 23 to control the total pressure of the mixed gas by means of an open degree of the valve body, each of which is arranged in this order from upstream, and further comprises a concentration controller control part 24. In order to control the concentration of the material gas in the mixed gas, it is necessary to arrange the pressure sensor 22 upstream of the first valve 23. This is because the total pressure in the tank 13 and the concentration of the material gas in the mixed gas are measured accurately so as to be adjusted to a change of the evaporative state of the material liquid.

Figure 10:
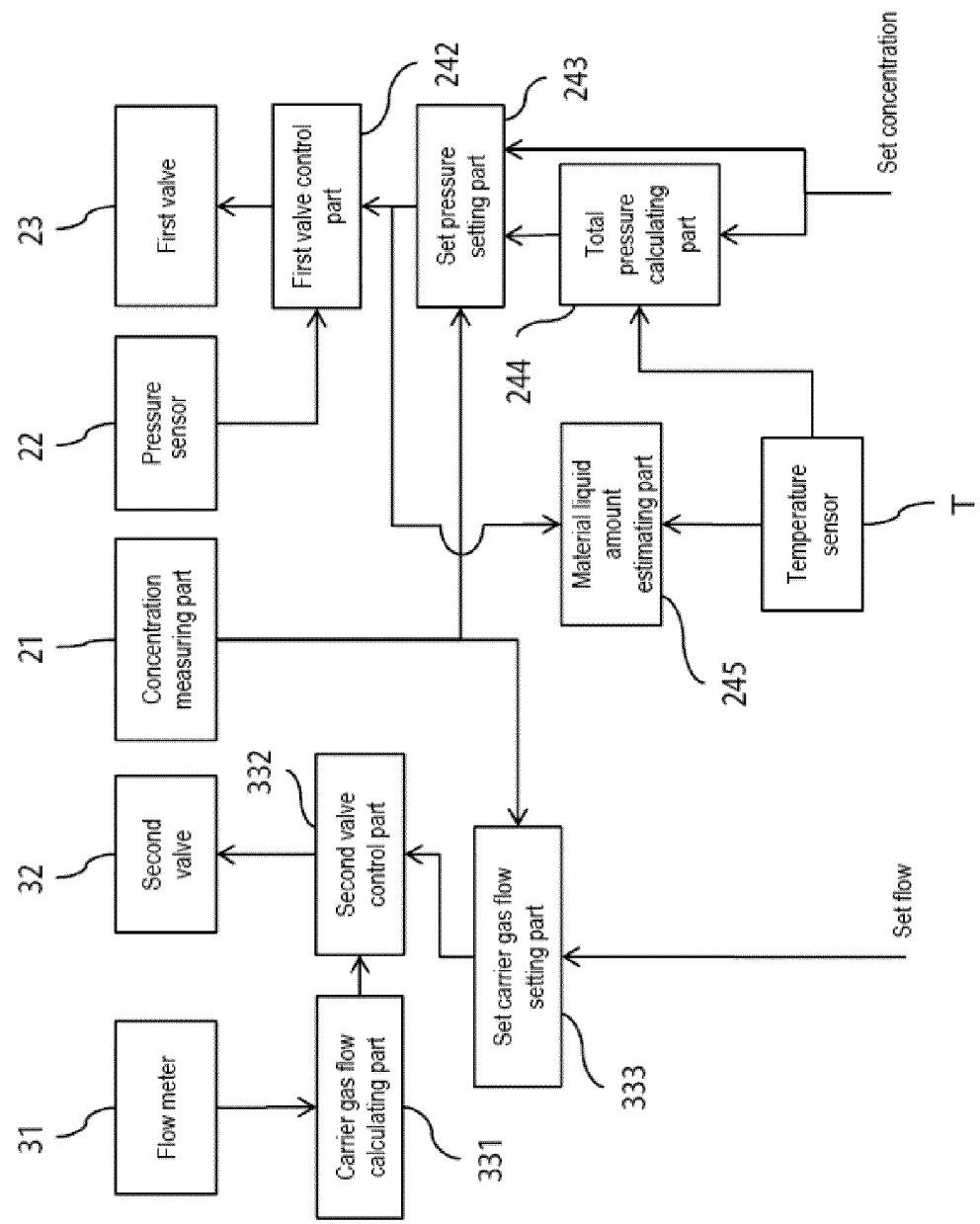
FIG. 10 is a functional block diagram in accordance with the third embodiment.

As shown in FIG. 9 and FIG. 10, the concentration controller control part 24 comprises a concentration control part CC and a material liquid amount estimating part 245 to estimate an amount of the material liquid L in the tank 13. The concentration control part CC controls the first valve 23 so as to make the measured concentration measured by the concentration measuring part 21 (CS) end up becoming the previously determined set concentration, and comprises the first valve control part 242, the set pressure setting part 243 to set the set pressure to the first valve control part 242, and the total pressure calculating part 244 to calculate the set pressure set to the first valve control part 242 by the set pressure setting part 243 during a predetermined period after the set concentration is changed.

Unlike the above-mentioned first embodiment and the second embodiment, in the third embodiment, the concentration measuring part CS outputs the concentration by itself, and a concentration calculating part 241 to calculate the concentration of the material gas in the mixed gas from the total pressure and the partial pressure is omitted as shown in FIG. 9 and FIG. 10.

The total pressure calculating part 244 calculates the pressure in the tank so as to make the concentration of the material gas become the set concentration at the temperature measured by the temperature sensor T and sets the calculated pressure as the temporary set pressure. The calculated pressure in the tank is transmitted to the set pressure setting part 243 and used as the set pressure set to the first valve control part 242 by the set pressure setting part 243 at a time of starting up or during the predetermined period after the set concentration is changed.

A method for calculating the pressure in the tank by the total pressure calculating part 244 will be concretely explained. The total pressure calculating part 244 calculates the saturated vapor pressure of the material gas at the temperature in the tank 13. The total pressure calculating part 244 calculates the pressure in the tank, namely the total pressure to make the material gas at a newly set concentration under an assumption that the material liquid L evaporates at the saturated vapor pressure in the tank 13. Since the concentration is expressed by dividing the partial pressure by the total pressure, the pressure in the tank can be obtained by dividing the saturated vapor pressure of the material gas at the measured temperature by the newly set concentration.

The material liquid amount estimating part 245, which corresponds to the material amount estimating part in the claims, calculates the pressure representing the pressure to be measured by the pressure measuring part where the material gas is kept at the set concentration based on the measured temperature measured by the temperature sensor T and estimates the stored amount of the material liquid based on the set pressure and the calculated pressure.

First, the material liquid amount estimating part 245 calculates the saturated vapor pressure of the material gas in the tank 13 at the measured temperature measured by the temperature sensor T and calculates the pressure representing the pressure to be measured by the pressure sensor 22 by the use of the saturated vapor pressure and the set concentration in the case where both the material gas is kept at the set concentration and where the material gas evaporates at the saturated vapor pressure. Next, the amount of the material liquid L in the tank 13 is estimated by comparing the set pressure and the calculated pressure.

More concretely, in the case where the amount of the material liquid L is reduced, the material liquid L may fails to achieve vapor-liquid equilibrium due to a reduction of a contact time between bubbles of the carrier gas and the liquid material L is shortened, and the partial pressure of the material gas is less than the saturated vapor pressure. Since the set pressure setting part changes the set pressure so as to reduce the total pressure in order to keep the concentration, the set pressure becomes smaller than the calculated pressure.

Accordingly, the material liquid amount estimating part 245 estimates that the stored amount of the material liquid L becomes lower than the specified amount in the case where the set pressure becomes less than a predetermined ratio to the calculated pressure. At a time when the material liquid amount estimating part 245 estimates that the stored amount of the material liquid L drops below the specified amount, this state is displayed so as to urge the material liquid L be supplied.

Figure 11:
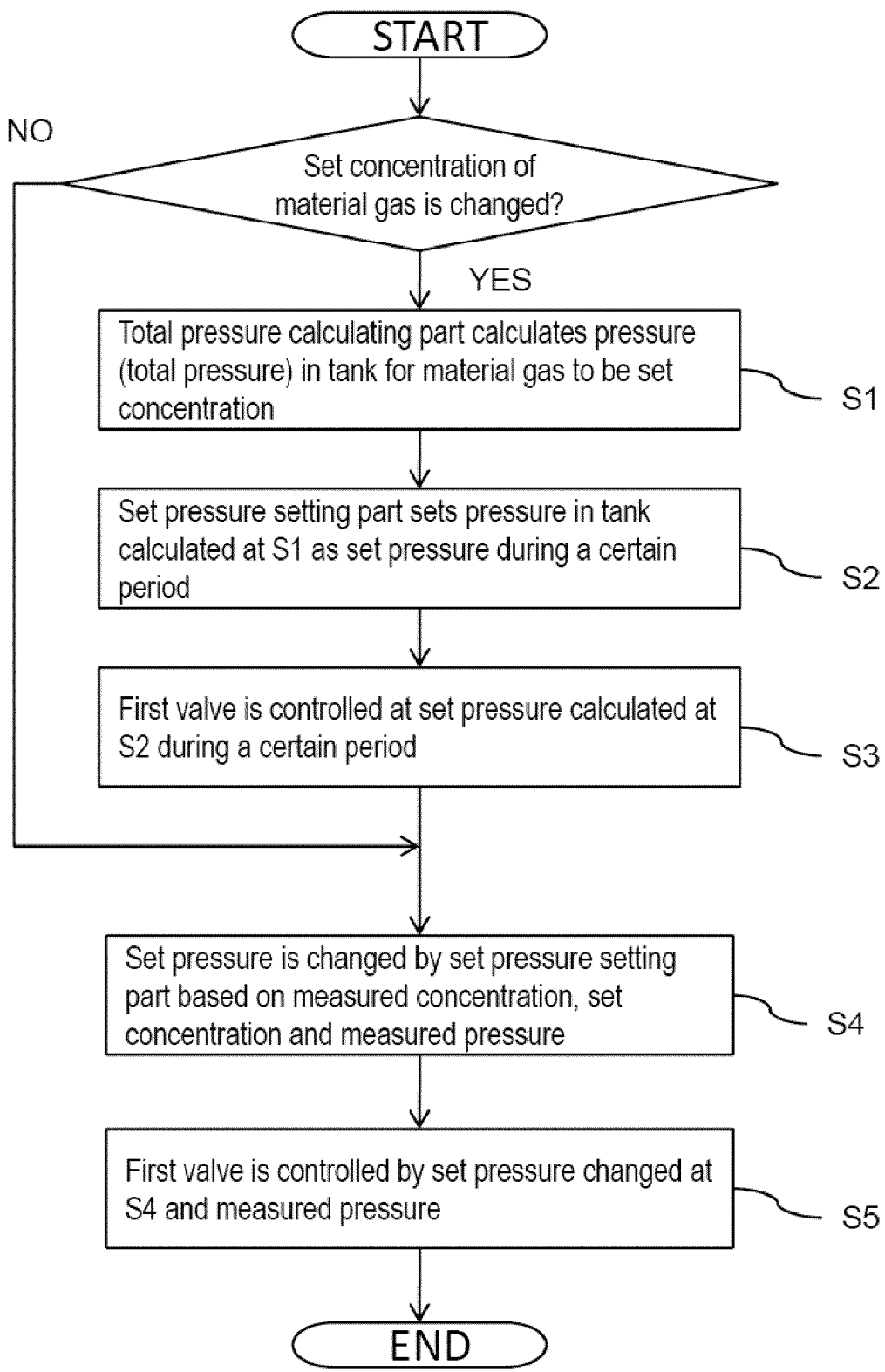
FIG. 11 is a flow chart showing a method of operation of the material gas concentration control system in accordance with the third embodiment.
Figure 12:
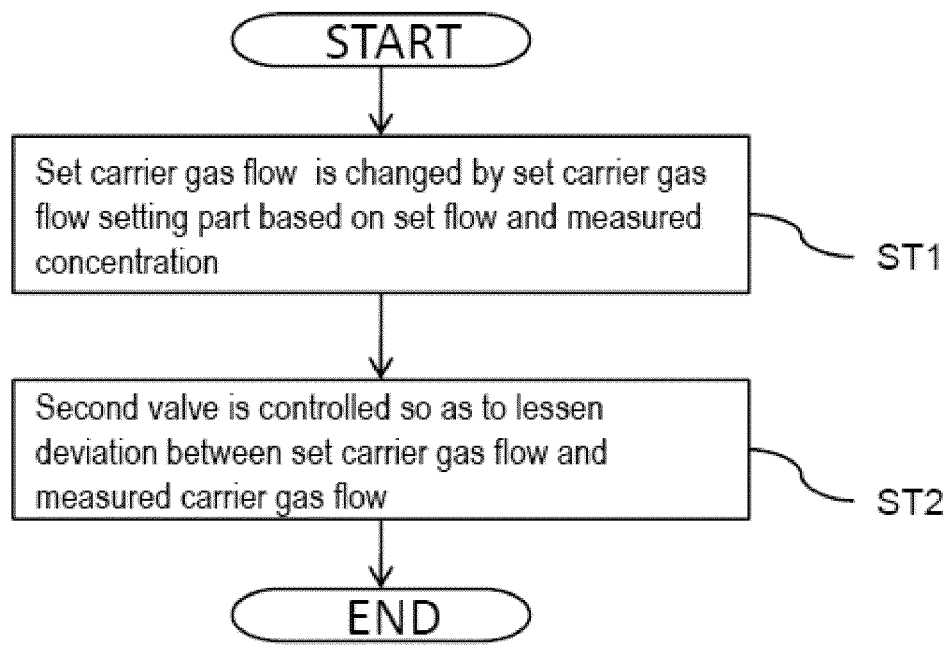
FIG. 12 is a flow chart showing a method of controlling a carrier gas flow in accordance with the third embodiment.

Next, an operation of controlling the concentration of the material gas in the mixed gas and an operation of controlling the flow of the mixed gas and the material gas will be explained with reference to the flow charts in FIG. 11 and FIG. 12.

First, an operation of controlling the concentration by controlling the open degree of the first valve 23 so as to be the set concentration will be explained with reference to FIG. 11.

At a start-up time when the set concentration is first set or at a time where the set concentration is changed, first the total pressure calculating part 244 calculates the saturated vapor pressure of the material gas based on the temperature measured by the temperature sensor T. At a time when the partial pressure of the material gas is the saturated vapor pressure, the total pressure calculating part 244 calculates the pressure in the tank 13, namely, the total pressure $P_{ts}$ (temporary set pressure) of the mixed gas by the use of the set concentration and the calculated partial pressure by the expression (1) (Step S1).

$$P_t = P_z/C \tag{1}$$

Wherein, C is the concentration, $P_z$ is the partial pressure of the material gas, and $P_t$ is the total pressure of the mixed gas.

The set pressure setting part 243 sets the total pressure $P_{ts}$ (the temporary set pressure) as the set pressure to the first valve control part 242 and does not change the set pressure during a predetermined period after the set concentration is changed even though the partial pressure of the material gas fluctuates (step S2). The first valve control part 242 controls the open degree of the first valve 23 by means of the set pressure $P_{ts}$ during the predetermined period, resulting in controlling the concentration measured by the concentration measuring part 21(CS) to be the set concentration or a value close to the set concentration (step S3).

At a time of an ordinary operation after expiration of a predetermined period from a time after the set concentration is changed, when the concentration measured by the concentration measuring part is different from the set concentration set by the set pressure setting part 243, the set pressure setting part 243 changes the set pressure $P_{t0}$ as follows based on the measured concentration C measured by the concentration measuring sensor 21(CS), the set concentration $C_0$ and the measured pressure $P_t$ measured by the pressure sensor 22 by the expression (5) (step S4).

$$P_{t0} = (C/C_0)P_t \tag{5}$$

Wherein, each of C and $P_t$ is a continuously measured value, and $C_0$ is a known value because of a set concentration.

At a time when the set pressure is changed to $P_{t0}$, the first valve control part 242 controls the open degree of the first valve 23 so as to reduce the deviation between the pressure (the total pressure) $P_t$ measured by the pressure sensor 22 and the set pressure $P_{t0}$ (step S5).

The most recently measured concentration of the material gas in the mixed gas becomes the set concentration $C_0$ if the partial pressure $P_z$ does not fluctuate while the measured pressure $P_t$ follows the set pressure $P_{t0}$.

When the measured concentration C fluctuates while the measured pressure $P_t$ follows the set pressure $P_{t0}$, the set pressure setting part 243 changes the set pressure $P_{t0}$ again by the expression (5) so as to be the set concentration $C_0$.

Next, the control of the material gas or the total flow in the outlet line 12 will be explained with reference to FIG. 12. The mass flow controller 3 independently controls the flow of the material gas irrespective of the mode of controlling the concentration by the concentration controller 2.

Assuming that the set flow $Q_{z0}$ of the material gas is set by the set carrier gas flow setting part 333. First, a relationship between the flow and the concentration is expressed by the following expression (3).

$$C = P_z/P_t = Q_z/Q_t = Q_z/(Q_c + Q_z) \qquad (3)$$

Wherein, $Q_z$ is the material gas flow, $Q_t$ is the total gas flow, and $Q_c$ is the carrier gas flow.

The set carrier gas flow setting part 333 sets the set carrier gas flow $Q_{c0}$ by the following expression (4) that is a modified expression (3) (step ST1).

$$Q_{c0} = Q_{z0}(1-C)/C \qquad (4)$$

Wherein, the concentration C is a value continuously measured by the concentration measuring part 21(CS), and $Q_{z0}$ is a known value because it is a set value.

At a time when the set carrier gas flow is changed to $Q_{c0}$, the second valve control part 332 controls the open degree of the second valve 32 so as to reduce the deviation between the carrier gas flow $Q_c$ measured by the flow measuring part and the set carrier gas flow $Q_{c0}$ (step ST2).

The most recently measured flow of the carrier gas becomes the set carrier gas flow $Q_{c0}$ if the concentration C does not fluctuate while the measured carrier gas flow $Q_c$ follows the set carrier gas flow $Q_{c0}$.

When the concentration C fluctuates while the measured carrier gas flow $Q_c$ follows the set carrier gas flow $Q_{c0}$, the set carrier gas flow setting part 333 changes the set carrier gas flow $Q_{c0}$ again by the expression (4) so as to be the predetermined material gas flow $Q_{z0}$.

As mentioned, in accordance with the material gas concentration control system 100 of this embodiment, since the concentration is controlled by the use of the total pressure that can be easily controlled by the first valve 23 as the control variable and not by the partial pressure having a poor responsiveness or the concentration containing the partial pressure as the control variable, it is possible to control the concentration of the material gas with high accuracy and high responsiveness even though the material gas fails to achieve liquid-vapor equilibrium with the carrier gas or the evaporation rate of the material gas fluctuates.

Accordingly, at a time when the partial pressure of the material gas in the mixed gas drops due to an insufficient evaporation rate of the material gas because the level of the material liquid is low, the set pressure setting part works so as to keep the set concentration by lowering the set pressure.

Since the behavior of the set pressure setting part is monitored by the material liquid amount estimating part, it is possible to estimate and calculate the stored amount of the material liquid L based on the set pressure.

In addition, since the temperature sensor T is arranged in the tank 13 so as to estimate and calculate the stored amount of the material gas by separating a drop of the partial pressure of the material gas due to the temperature change and a drop of the partial pressure of the material gas due to a decrease of the liquid amount, it is possible to estimate and calculate the stored amount of the material liquid L more accurately.

As a result, since the stored amount of the material liquid can be gauged without providing the liquid amount sensor in the tank 13, it is possible to prevent increase of the cost. In addition, since the stored amount of the material liquid L can be estimated and calculated with accuracy, the material liquid L can be appropriately supplied. As a result, it is possible to prevent the time required for stabilizing the concentration at the set concentration due to decrease of the material liquid L from being lengthened.

Other embodiment will be explained.

In the above-mentioned embodiment, both the concentration of the material gas and the flow of the material gas are controlled, however, in case that only the concentration is to be controlled, the concentration controller 2 alone will do without the mass flow controller 3.

The concentration measuring part CS directly measures the concentration, however, the concentration may be calculated by the use of the partial pressure and the total pressure. In addition, the concentration measuring part 21(CS) may comprise the non-dispersive infrared (NDIR) method, a Fourier transform infrared (FTIR) spectroscopy or a partial pressure measuring sensor such as a laser absorption spectroscopy (LAS) method, and a pressure sensor to measure the pressure (the total pressure) of the mixed gas. In addition, the pressure sensor may be used in common with the pressure measuring part to measure the pressure in the tank described in the claims, and may be independently provided. With this arrangement, the material liquid amount estimating part may estimate the amount of the material by comparing the partial pressure of the material gas and the saturated vapor pressure in the tank calculated at the measured temperature. More specifically, if the measured partial pressure is low relative to the saturated vapor pressure, it may mean that the evaporation rate is low. In turn, this may mean that the amount of material liquid is low.

In addition, when the temperature in the tank is kept at a constant value by means of a constant-temperature bath, so as to take a sufficient measure not to cause temperature change, the material liquid estimating part maintains the saturated vapor pressure at the constant temperature. Then the material liquid material may be estimated by comparing the saturated vapor pressure with the measured partial pressure.

Figure 13:
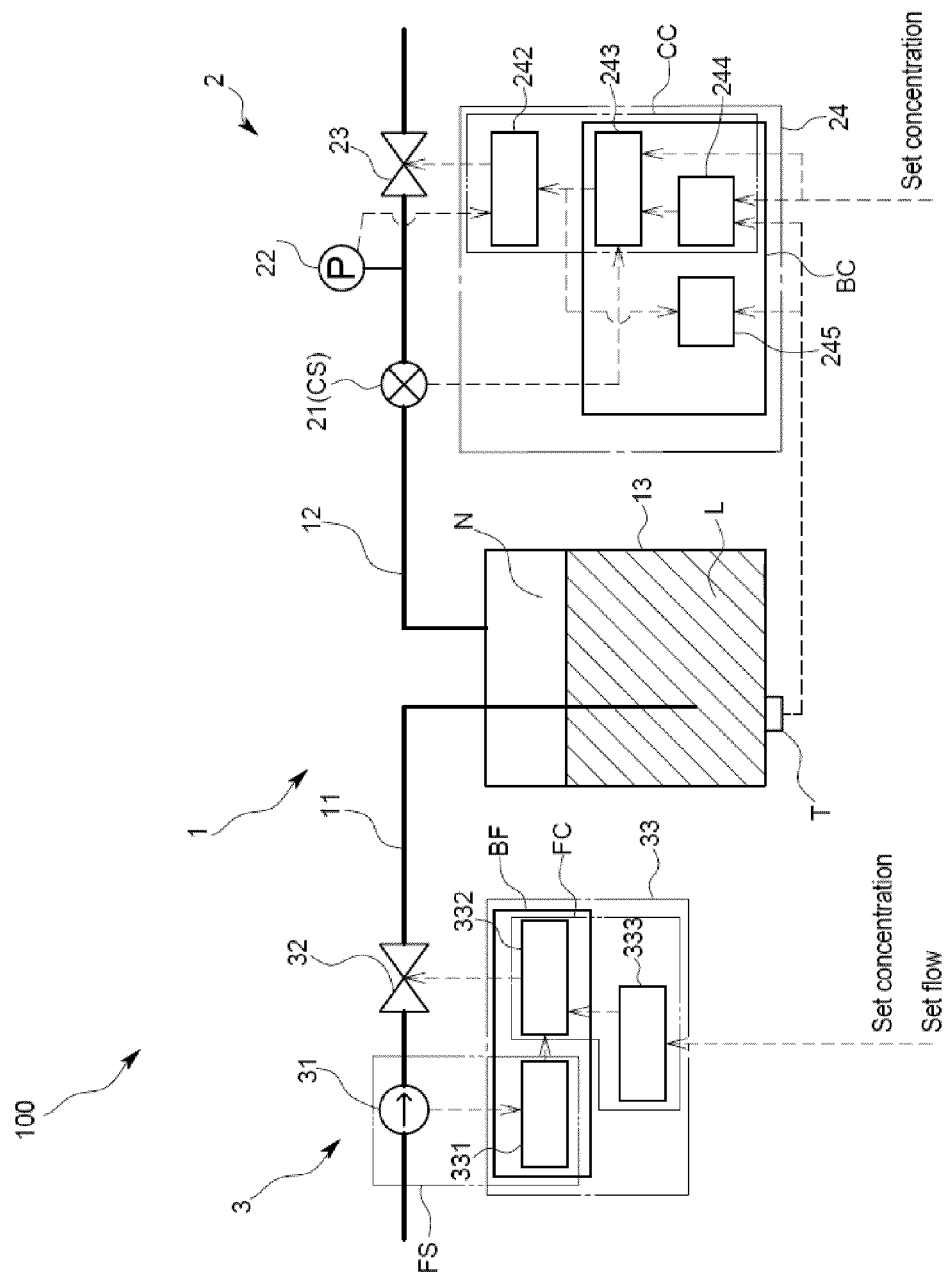
FIG. 13 is a schematic diagram of a material gas concentration control system in accordance with another configuration of the third embodiment of this invention.

When only the concentration of the material gas in the mixed gas is controlled accurately and the flow of the mixed gas is not necessarily required to be a certain fixed value for the mixed gas to flow stably, the flow may be controlled without feed-back of the measured concentration from the concentration controller 2 to the mass flow controller 3 as shown in FIG. 13. In this case, the set carrier gas flow may be calculated by the expression (3) by the use of the set concentration and the set flow. In addition, if the concentration of the material gas is kept constant by the concentration controller 2 even though the flow of the carrier gas is previously determined and the carrier gas flows in the determined flow, the flow of the material gas and the flow of the mixed gas end up with being constant.

A temperature sensor may be provided to the concentration controller 2 so as to compensate the change of the measured result of the pressure or the partial pressure due to the temperature change. With this arrangement, it is possible to control the concentration with higher accuracy. In addition, a signal showing a deteriorated state of the light source may be obtained from the concentration measuring part. For example, the concentration controller control part may have such an arrangement that a lifetime of the light source is gauged by means of a moment-to-moment change of a current that flows in the light source and so that a notice is displayed to urge the light source be exchanged before a critical influence is exerted on the measurement result.

In the above-mentioned embodiment, the material liquid amount estimating part 245 receives the signal from the temperature sensor T, however, the temperature sensor T may not be provided in case that a constant-temperature bath is arranged to reduce the temperature change in the tank 13 or the temperature change is small so as to be negligible.

In case that the temperature sensor is not arranged, a standard set pressure is previously obtained experimentally or calculated so as to obtain the reference pressure at the set concentration in the state that the material liquid is sufficiently stored, and the stored amount of the material liquid may be estimated and calculated by how much the set pressure drops from the reference pressure. With this arrangement, it is possible to estimate the material liquid amount only by an internal sensor used for controlling without using an outside sensor, thereby enabling cost savings.

In the above-mentioned embodiment, the material is liquid, however, an amount of the solid stored in the tank can be estimated by the material amount estimating part without using an outside sensor.

In the above-mentioned embodiment, the first valve control part controls the open degree of the first valve by means of the set pressure and the measured pressure, however, the open degree may be directly controlled by the deviation between the set concentration and the measured concentration.

More specifically, the material gas concentration control system may be used for a material evaporation system comprising a tank to accommodate a material, an inlet line to input a carrier gas for evaporating the accommodated material into the tank and an outlet line to output a mixed gas consisting of a material gas formed by the evaporated material and the carrier gas from the tank, and may be characterized by comprising a first valve arranged in the outlet line, a concentration measuring part that measures the concentration of the material gas in the mixed gas, a pressure measuring part that measures the pressure in the tank, a concentration control part that controls an open degree of the first valve so as to make the measured concentration of the material gas measured by the concentration measuring part become a previously determined set concentration, and a material amount estimating part that estimates the amount of the material accommodated in the tank, wherein the concentration measuring part comprises a first valve control part that controls the first valve so as to reduce the deviation between the measured concentration and the set concentration, and the material amount estimating part estimates and calculates the amount of the material based on the measured pressure.

With this arrangement, since the total pressure drops due to the decrease of the amount of the material in a state that the concentration is kept constant, the material amount estimating part can estimate the amount of the material stored in the tank by detecting the drop of the total pressure by means of the measured pressure. Accordingly, it is possible to estimate the amount of the material stored in the tank and to urge the material be supplied.

In addition, the concentration measuring part measures the total pressure of the mixed gas by itself like an ultrasonic concentration meter, and may further comprise a partial pressure measuring sensor to measure the partial pressure of the material gas. With this arrangement, the material amount estimating part may estimate the amount of the material stored in the tank by calculating the total pressure of the mixed gas from the measured concentration and the measured partial pressure without measuring the total pressure of the mixed gas. Furthermore, if the temperature measuring part to measure the temperature in the tank is comprised, it is possible to estimate the amount of the material by correcting an influence due to decrease of the vaporized amount because the temperature drops or an influence due to decrease of the vaporized amount because of the decrease of the material amount.

In addition, various modifications can be conducted without departing from a spirit of the invention.

EXPLANATION OF REFERENCE CHARACTERS

100 . . . material gas concentration control system
1 . . . material evaporation system
11 . . . inlet line
12 . . . outlet line
13 . . . tank
14 . . . converged outlet line
CS . . . concentration measuring part
MCS . . . multi component concentration measuring part
21 . . . partial pressure measuring sensor
22 . . . pressure measuring part
23 . . . first valve
CC . . . concentration control part
242 . . . first valve control part
243 . . . set pressure setting part
FS . . . flow measuring part
FC . . . flow control part
32 . . . second valve
332 . . . second valve control part
333 . . . set carrier gas flow setting part

The invention claimed is:

1. A material gas concentration control system that is used for a material evaporation system comprising a tank to accommodate a material, an inlet line to input a carrier gas for evaporating the accommodated material into the tank and an outlet line to output a mixed gas consisting of a material gas formed by the evaporated material and the carrier gas from the tank, and characterized by comprising:
   a first valve arranged in the outlet line,
   a concentration measuring part that measures a concentration of the material gas in the mixed gas, and
   a concentration control part that controls an open degree of the first valve so as to make the measured concentration of the material gas measured by the concentration measuring part become a previously determined set concentration,
   wherein the concentration measuring part comprises a pressure measuring part that measures a pressure in the tank, and
   wherein the concentration control part comprises:
      a set pressure setting part that changes the set pressure so as to reduce a deviation between the measured concentration and the set concentration, and a first valve control part that controls an open degree of the first valve so as to make a measured pressure measured by the pressure measuring part become the set pressure,
and controls the measured concentration of the measured material gas so as to be the previously determined set concentration.

2. The material gas concentration control system described in claim 1, wherein
the concentration measuring part comprises a partial pressure measuring sensor that measures a partial pressure of the material gas by the Non Dispersive Infra Red method and a concentration calculating part that calculates the concentration of the material gas based on the measured partial pressure of the material gas and the measured pressure.

3. The material gas concentration control system described in claim 1, further comprising:
a second valve arranged in the inlet line,
a flow measuring part that measures a flow of the carrier gas flowing in the inlet line, and
a flow control part that controls an open degree of the second valve so as to make the measured flow of the carrier gas become a set carrier gas flow calculated based on a previously determined set flow of the material gas or the mixed gas flowing in the outlet line and the set concentration, or the previously determined set carrier gas flow.

4. The material gas concentration control system described in claim 3, wherein
the concentration measuring part comprises a partial pressure measuring sensor that measures a partial pressure of the material gas by the Non Dispersive Infra Red method and a concentration calculating part that calculates the concentration of the material gas based on the measured partial pressure of the material gas and the measured pressure.

5. The material gas concentration control system described in claim 1, and comprising:
a second valve arranged in the inlet line,
a flow measuring part that measures a flow of the carrier gas flowing in the inlet line, and
a flow control part that calculates a flow of the material gas or the mixed gas flowing in the outlet line based on the measured concentration of the material gas and the measured flow of the carrier gas and controls an open degree of the second valve so as to make the calculated flow become the previously determined set flow.

6. The material gas concentration control system described in claim 5, wherein
the concentration measuring part comprises a partial pressure measuring sensor that measures a partial pressure of the material gas by the Non Dispersive Infra Red method and a concentration calculating part that calculates the concentration of the material gas based on the measured partial pressure of the material gas and the measured pressure.

7. The material gas concentration control system described in claim 6, wherein the flow control part comprises:
a set carrier gas setting part that changes the previously determined set carrier gas flow so as to reduce a deviation between the calculated flow and the set flow, and
a second valve control part that controls the open degree of the second valve so as to make the measured carrier gas flow measured by the flow measuring part become the set carrier gas flow.

8. The material gas concentration control system described in claim 7, wherein
the concentration measuring part comprises a partial pressure measuring sensor that measures a partial pressure of the material gas by the Non Dispersive Infra Red method and a concentration calculating part that calculates the concentration of the material gas based on the measured partial pressure of the material gas and the measured pressure.

9. A material gas concentration control system that is used for a material evaporation system comprising a tank to accommodate a material, an inlet line to input a carrier gas for evaporating the accommodated material into the tank and an outlet line to output a mixed gas consisting of a material gas formed by the evaporated material and the carrier gas from the tank, and characterized by comprising:
a first valve arranged in the outlet line,
a concentration measuring part that comprises a pressure measuring part to measure the pressure in the tank and that measures the concentration of the material gas in the mixed gas,
a temperature measuring part that measures a temperature in the tank, and
a concentration control part that controls an open degree of the first valve so as to make the measured concentration of the material gas measured by the concentration measuring part become a previously determined set concentration, wherein
the concentration control part comprises:
a total pressure calculating part that calculates the pressure in the tank so as to make the material gas become the set concentration based on a measured temperature measured by the temperature measuring part,
a set pressure setting part that sets the set pressure as the pressure in the tank calculated by the total pressure calculating part during a predetermined period after the set concentration is changed, while the set pressure setting part that changes the set pressure so as to reduce a deviation between the measured concentration and the set concentration during other periods, and
a first valve control part that controls an open degree of the first valve so as to make a measured pressure measured by the pressure measuring part become the set pressure.

10. The material gas concentration control system described in claim 9, wherein
the total pressure calculating part calculates a saturated vapor pressure of the material gas based on the measured temperature measured by the temperature measuring part and calculates the pressure in the tank based on the saturated vapor pressure so as to make the material gas become the set concentration.

11. A material gas concentration control system that is used for a material evaporation system comprising a tank to accommodate a material, an inlet line to input a carrier gas for evaporating the accommodated material into the tank and an outlet line to output a mixed gas consisting of a material gas formed by the evaporated material and the carrier gas from the tank, and characterized by comprising:
a first valve arranged in the outlet line,
a concentration measuring part that measures the concentration of the material gas in the mixed gas,
a pressure measuring part that measures a pressure in the tank,
a concentration control part that controls an open degree of the first valve so as to make the measured concentration of the material gas measured by the concentration measuring part become a previously determined set concentration, and a material amount estimating part that estimates an amount of the material accommodated in the tank, wherein the concentration control part comprises:

a set pressure setting part that changes the set pressure so as to reduce a deviation between the measured concentration and the set concentration, and a first valve control part that controls an open degree of the first valve so as to make a measured pressure measured by the pressure measuring part become the set pressure, and the material amount estimating part estimates and calculates an amount of the material accommodated in the tank based on the set pressure.

12. The material gas concentration control system described in claim 11, further comprising:

a temperature measuring part that measures a temperature in the tank, wherein the material amount estimating part calculates a calculated pressure representing a pressure to be measured by the pressure measuring part in a state that the concentration is kept at the set concentration based on the measured temperature measured by the temperature measuring part, and estimates and calculates the amount of the material accommodated in the tank based on the set pressure and the calculated pressure.

* * * * *